United States Patent
Kim et al.

(10) Patent No.: US 11,009,912 B2
(45) Date of Patent: May 18, 2021

(54) MOBILE TERMINAL AND METHOD FOR CONTROLLING THE SAME

(71) Applicant: LG ELECTRONICS INC., Seoul (KR)

(72) Inventors: Changmok Kim, Seoul (KR); Jinhee Lee, Seoul (KR); Eunkyung Choi, Seoul (KR); Junho Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/930,975

(22) Filed: May 13, 2020

(65) Prior Publication Data

US 2021/0072796 A1 Mar. 11, 2021

(30) Foreign Application Priority Data

Sep. 6, 2019 (WO) ................ PCT/KR2019/011526

(51) Int. Cl.
| | |
|---|---|
| *G06F 1/16* | (2006.01) |
| *G06F 3/0488* | (2013.01) |
| *G06F 3/0486* | (2013.01) |
| *G06F 3/041* | (2006.01) |

(Continued)

(52) U.S. Cl.
CPC .......... *G06F 1/1652* (2013.01); *G06F 1/1643* (2013.01); *G06F 1/1647* (2013.01); *G06F 3/0412* (2013.01); *G06F 3/0414* (2013.01); *G06F 3/0482* (2013.01); *G06F 3/0486* (2013.01); *G06F 3/04883* (2013.01); *G09G 3/2092* (2013.01); *G09G 2340/04* (2013.01); *G09G 2380/02* (2013.01)

(58) Field of Classification Search
CPC .... G06F 1/1651; G06F 1/1643; G06F 1/1647; G06F 3/0412; G06F 3/0414; G06F 3/0482; G06F 3/0486; G06F 3/0483; G09G 3/2092; G09G 2340/04; G09G 2380/02
See application file for complete search history.

(56) References Cited

U.S. PATENT DOCUMENTS

| | | | |
|---|---|---|---|
| 2013/0127918 A1* | 5/2013 | Kang | ..................... G06F 1/1652 345/660 |
| 2017/0011714 A1* | 1/2017 | Eim | ......................... G09G 5/38 |
| 2019/0384438 A1* | 12/2019 | Park | ....................... G06F 1/1652 |

FOREIGN PATENT DOCUMENTS

| | | |
|---|---|---|
| KR | 10-2015-0141048 A | 12/2015 |
| KR | 10-2016-0068534 A | 6/2016 |
| KR | 10-2016-0097174 A | 6/2016 |

(Continued)

*Primary Examiner* — Zhitong Chen
(74) *Attorney, Agent, or Firm* — Birch, Stewart, Kolasch & Birch, LLP

(57) ABSTRACT

A mobile terminal can include a body having a variable size; a flexible display including a first display located on a front face of the body and a second display located on a rear face of the body; a driving unit configured to change both the variable size of the body and a size of the first display; a sensing unit configured to sense an input signal; and a controller configured to in response to the input signal having a value equal to or greater than a threshold value, control the driving unit to change both the variable size of the body and the size of the first display, in which a total area of the first display and the second display remains constant, and a size of the second display is correspondingly reduced as the size of the first display increases.

20 Claims, 21 Drawing Sheets

(51) Int. Cl.
*G09G 3/20* (2006.01)
*G06F 3/0482* (2013.01)

(56) References Cited

FOREIGN PATENT DOCUMENTS

| | | |
|---|---|---|
| KR | 10-2017-0083405 A | 7/2017 |
| KR | 10-2019-0086305 A | 7/2019 |

* cited by examiner

FIG. 3
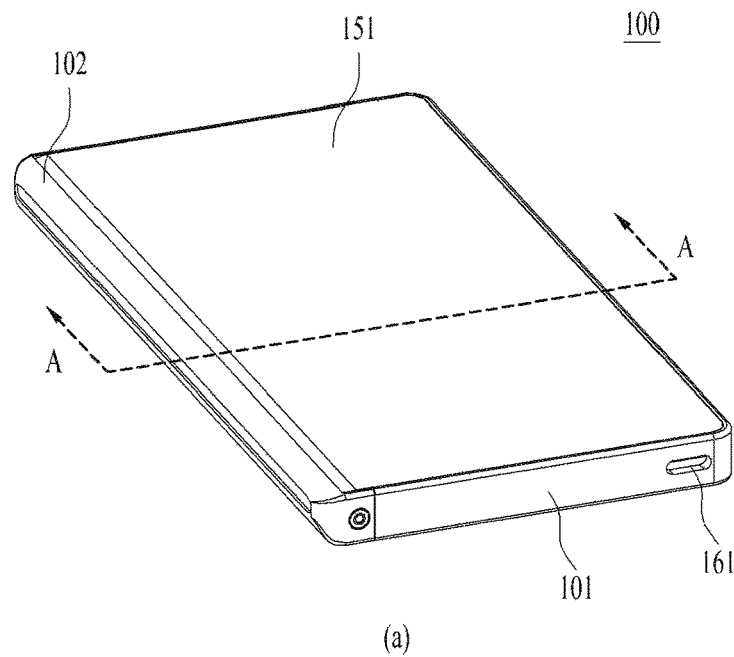
(a)
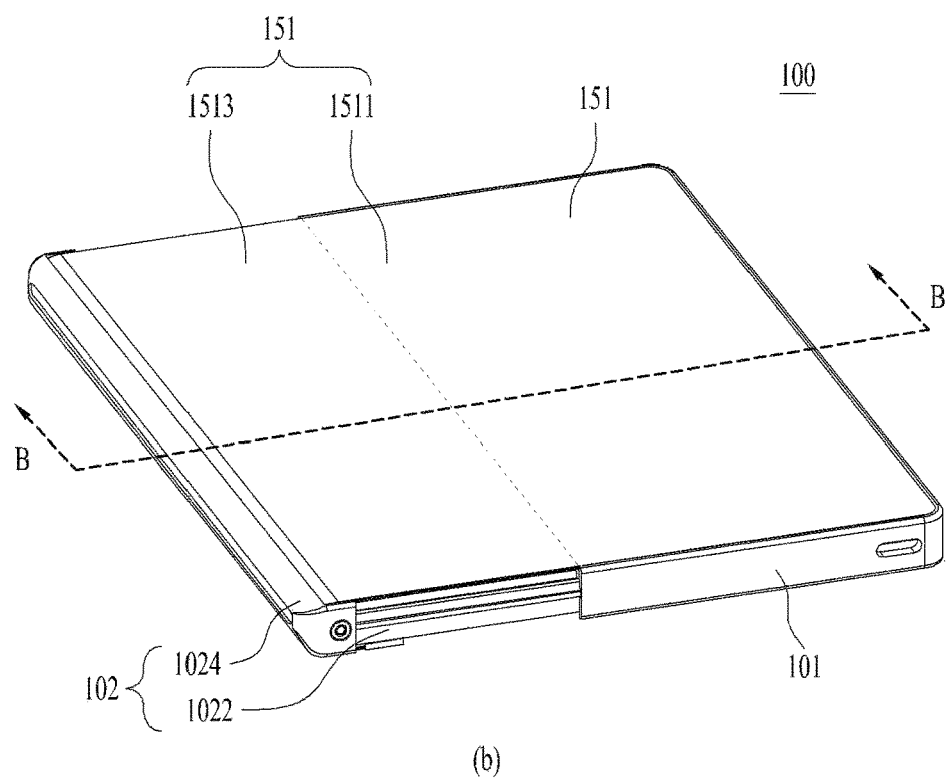
(b)

FIG. 4
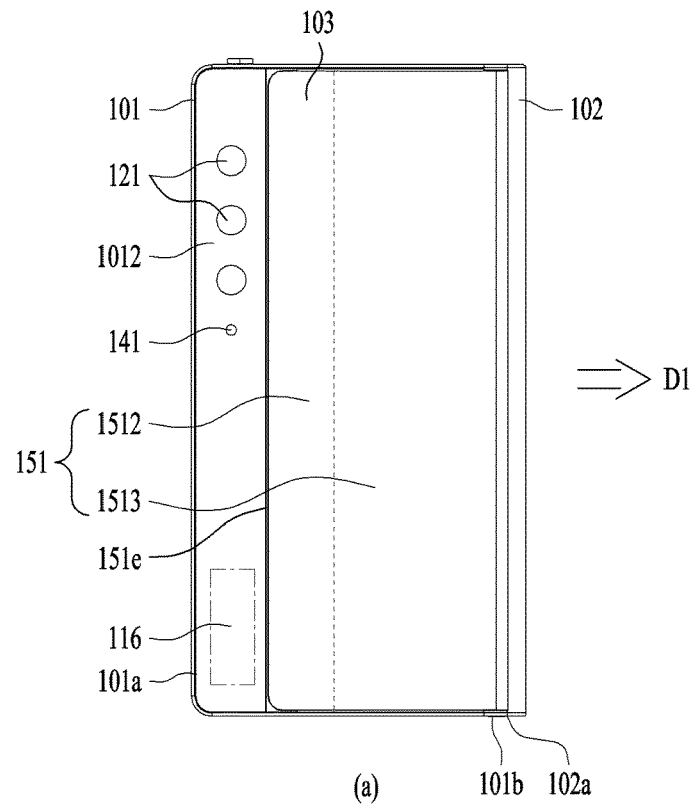
(a)
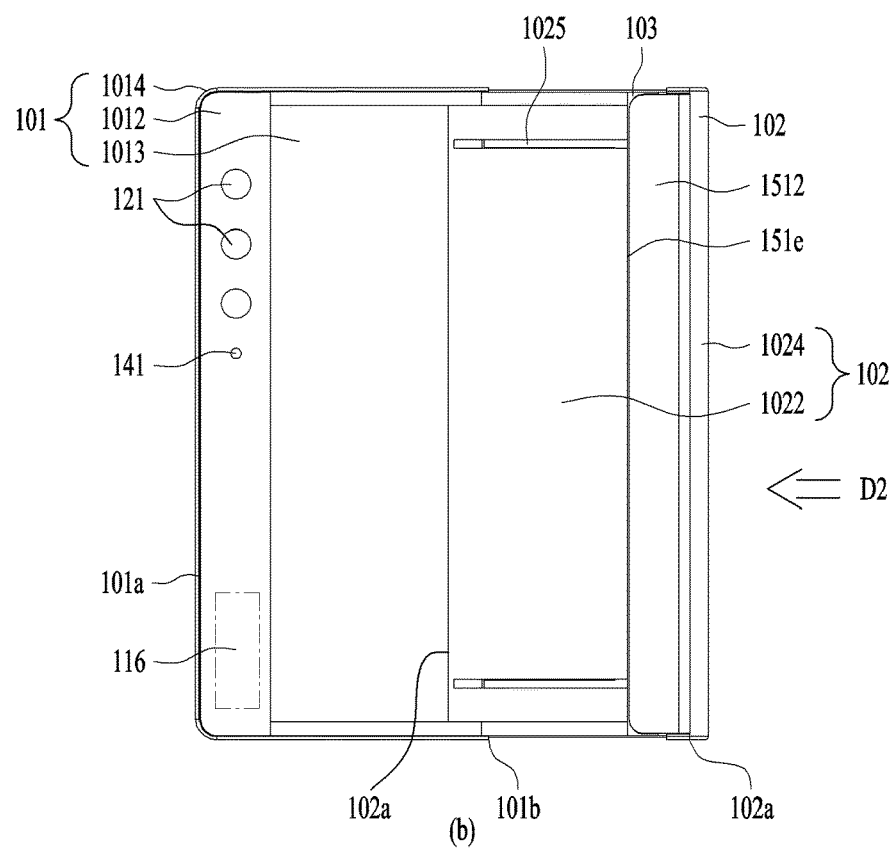
(b)

(a)                                    (b)

(a)       (b)

FIG. 11
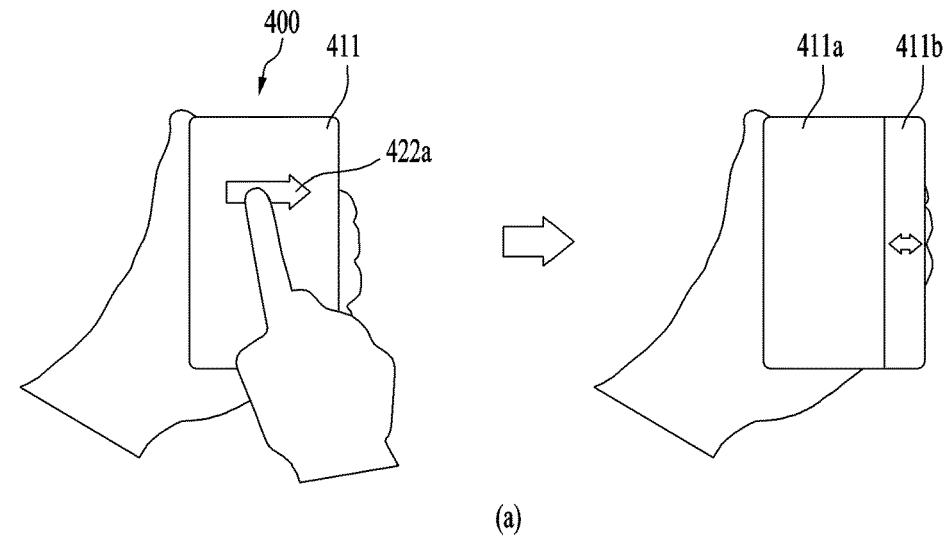
(a)
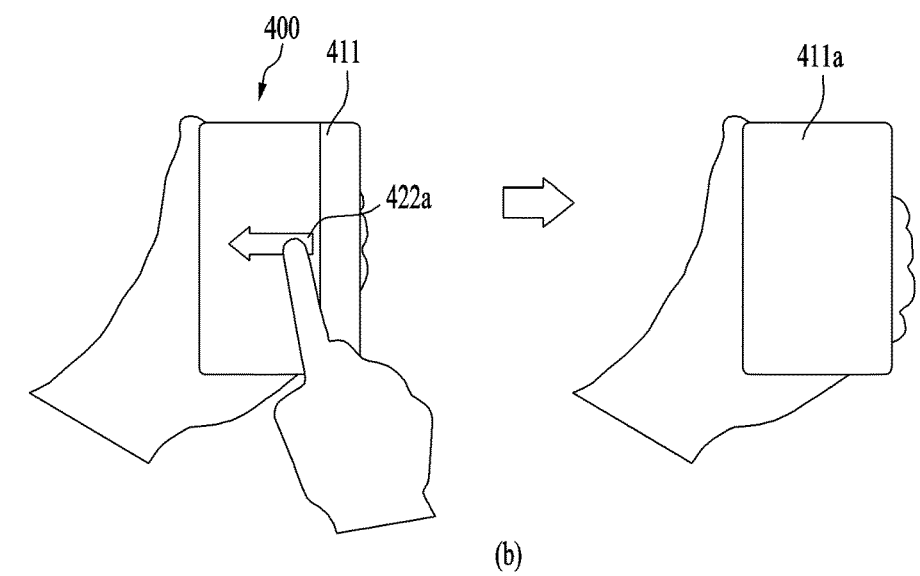
(b)
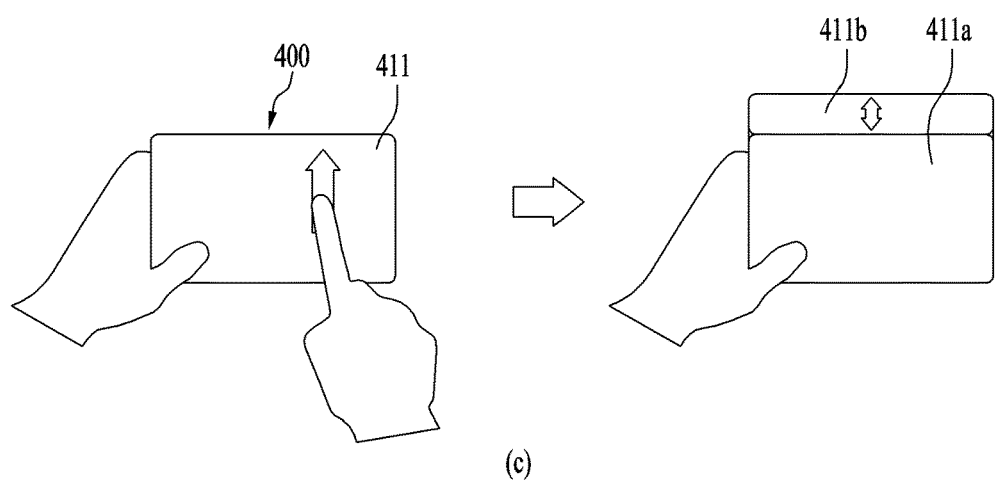
(c)

FIG. 13
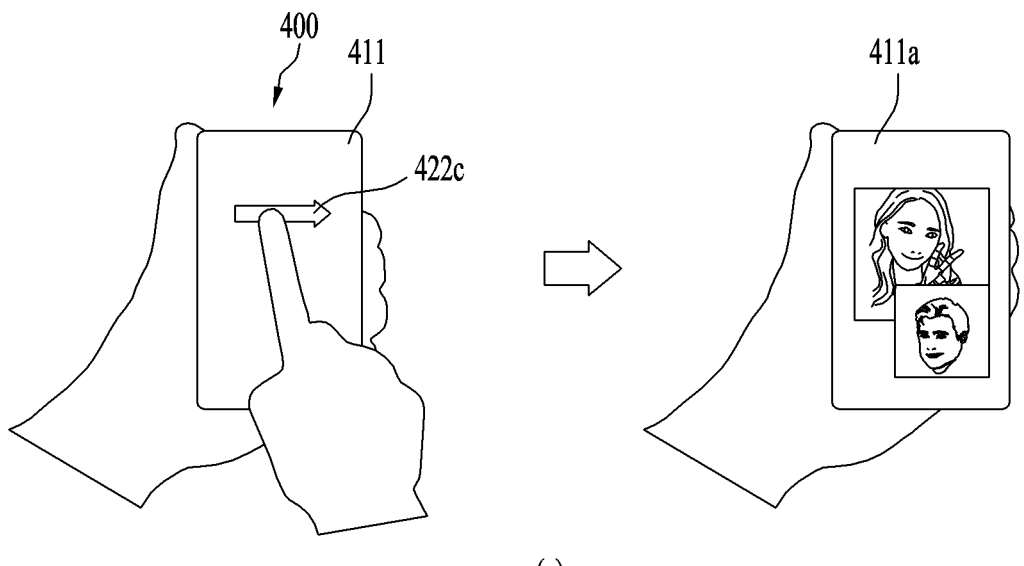
(a)
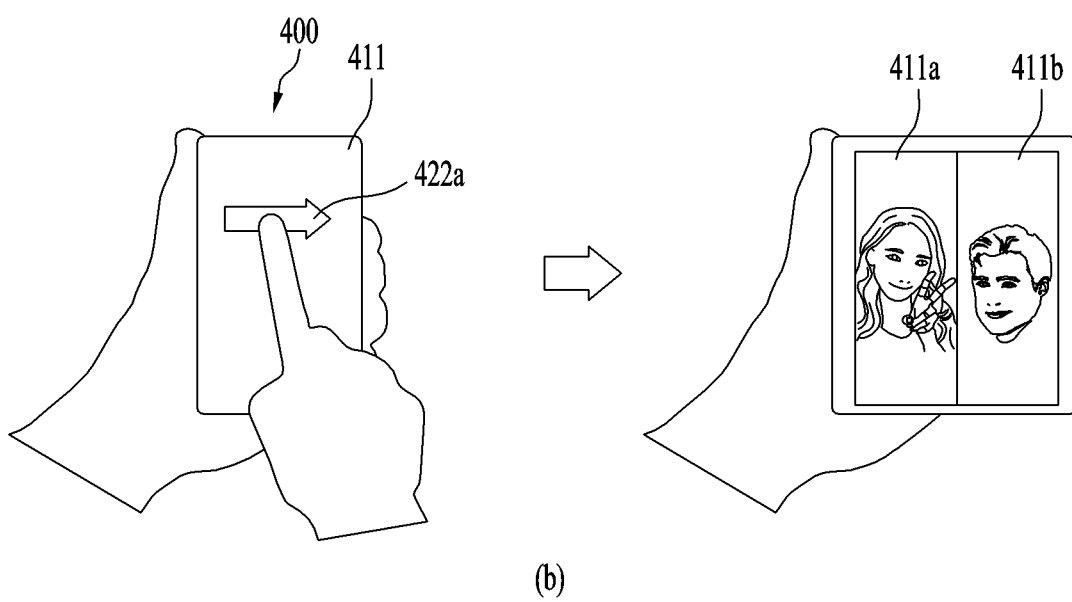
(b)

FIG. 17
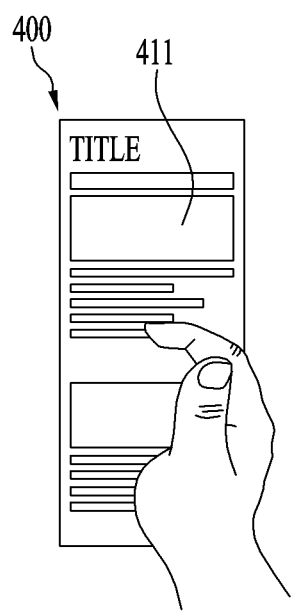
(a)
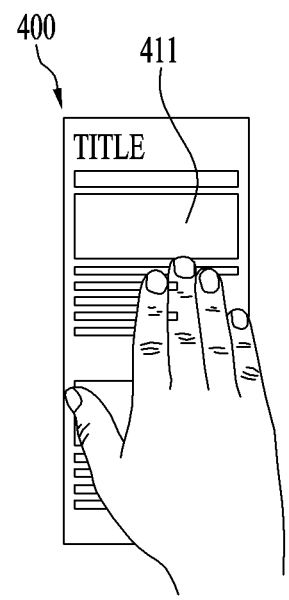
(b)

(a)　　　　　　　　　　　　　(b)

MOBILE TERMINAL AND METHOD FOR CONTROLLING THE SAME

CROSS REFERENCE TO RELATED APPLICATIONS

This application claims, under 35 U.S.C. § 119, the priority benefit of International Application No. PCT/KR2019/011526, filed on Sep. 6, 2019, which is hereby incorporated by reference as if fully set forth herein into the present application.

BACKGROUND

Field

The present disclosure relates to a mobile terminal, and relates to a mobile terminal having a flexible display whose size is able to be changed and a method for controlling the same.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

A display device is a device having a function of receiving, processing, and displaying a video that a user may watch. For example, the display device receives a broadcast selected by the user from broadcast signals transmitted from a broadcasting station, separates a video signal from the received signals, and displays the separated video signal on a display.

In recent years, because of a development of a broadcasting technology and a network technology, functions of the display device have also been considerably diversified, and a performance of the device has been improved accordingly. That is, the display device has been developed to provide not only broadcast contents but also various other contents to the user. For example, the display device may provide game play, music listening, internet shopping, user customized information, and the like using various applications as well as programs received from the broadcasting station. In order to perform such extended functions, the display device may be basically connected to other devices or networks using various communication protocols, and may provide the user with an ubiquitous computing environment. In other words, the display device has evolved into a smart device that enables connectivity to a network and continuous computing.

In one example, recently, a flexible display capable of large deformation with sufficient elasticity has been developed. Such flexible display may be deformed to a degree of being able to be rolled. The mobile terminal may accommodate the rolled flexible display and may protrude the display from a body thereof to a desired size. Thus, the mobile terminal may have a more compact structure using the flexible display. In addition, as the mobile terminal includes such a rollable display, the mobile terminal may be referred to as a rollable mobile terminal.

In order to use such rollable mobile terminal, the display may be withdrawn from the body. Simultaneously with such withdrawal, the display may be extended to a size desired by a user. However, in the extension process described above, a center of gravity of the mobile terminal may be changed, so that the mobile terminal may be departed from a user's hand. Therefore, there is a need for a new display extension method that minimizes the above problem and provides convenience to the user.

SUMMARY

One purpose of an embodiment of the present disclosure is to provide a mobile terminal capable of extending a display and a method for controlling the same.

Another purpose of an embodiment of the present disclosure is provide a mobile terminal that prevents departure of the mobile terminal from a user's hand in a process of extending a display of the mobile terminal and provides convenience to the user.

Furthermore, another purpose of an embodiment of the present disclosure is to solve various problems not mentioned herein. Those skilled in the art may understand the spirit of the specification and the drawings.

One aspect of the present disclosure proposes a mobile terminal including: a body having a variable size; a flexible display including a first display located on a front face of the body and a second display located on a rear face of the body; a driving unit (e.g., a driver) for changing the size of the body and a size of the first display; a sensing unit (e.g., a sensor) for sensing an input signal; and a controller (e.g., a processor) that controls the driving unit to change the size of the body and the size of the first display when the input signal is a signal having a value equal to or greater than a threshold value, wherein a total area of the flexible display including the first display and the second display is constant, and wherein a size of the second display is correspondingly reduced as a size of the first display increases.

In one implementation, the sensing unit may include a touch sensor embedded in the flexible display, and the threshold value may be determined based on a touch area on the first display of a user.

In one implementation, the controller may change the size of the first display based on a touch drag direction of the user when the touch area of the user is equal to or greater than the threshold value.

In one implementation, the controller may extend the size of the first display when the touch drag direction is a first direction, and reduce the size of the first display when the touch drag direction is a second direction.

In one implementation, the controller may, when a message is received by the mobile terminal, provide information about the message on a first extended display extended based on the touch drag of the user.

In one implementation, the controller may, when a video call is received by the mobile terminal, provide a video call screen on an entirety of the first display extended based on the touch drag of the user.

In one implementation, the controller may, when the sensing unit senses a plurality of touch signals simultaneously on the first display, sum areas based on the plurality of touch signals with each other and compare the sum with the threshold value.

In one implementation, the controller may change the size of the first display based on movements of the plurality of touch signals when the summed area is equal to or greater than the threshold value.

In one implementation, the controller may extend the size of the first display when the plurality of touch signals move in a direction to be farther away from each other, and reduce the size of the first display when the plurality of touch signals move in a direction to be closer to each other.

In one implementation, the controller may display, on the first display, a selection menu for determining whether to change the size of the first display when the input signal is the signal having the value equal to or greater than the threshold value.

In one implementation, the first display of the flexible display may be able to be changed to one of a plurality of sizes, wherein the controller may display, on the first display, a selection menu for selecting one of the plurality of sizes when the input signal is the signal equal to or greater than the threshold value.

In one implementation, the controller may control the selection menu to be displayed overlapping with a region of the first display touched by the user.

In one implementation, the sensing unit may include a force sensor, and the threshold value may be determined based on a pressure applied by a user to the sensing unit.

In one implementation, the sensing unit may include a fingerprint sensor, and the threshold value may be determined based on a fingerprint previously registered by a user.

In one implementation, a rear face of the body may include a first rear face including the second display of the flexible display disposed thereon a second rear face including the sensing unit disposed thereon.

In one implementation, the sensing unit may include a touch sensor embedded in the flexible display, and the threshold value may be determined based on a total contact area of a user with the touch sensor when the user inputs touch drag on the first display.

According to an embodiment of the present disclosure, the mobile terminal capable of extending the display and the method for controlling the same may be provided.

Specifically, when the input signal sensed by the sensing unit of the mobile terminal is equal to or greater than the threshold value, the display is extended or reduced based on the touch drag direction, so that the user may intuitively control the mobile terminal.

In addition, the mobile terminal of the present disclosure has an advantage of preventing the departure of the mobile terminal from the user's hand in the process of extending the display.

In addition, the input signal of the mobile terminal of the present disclosure may be variously set as the touch signal, the force signal, the fingerprint recognition signal, and the like, thereby providing convenience to the user.

Further, according to another embodiment of the present disclosure, there are additional technical effects not mentioned herein. Those skilled in the art may understand the spirit of the specification and the drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3, including parts (a) and (b), shows perspective views respectively illustrating a first state and a second state viewed from one side of a mobile terminal according to one embodiment;

FIG. 4 shows rear face views respectively illustrating a first state and a second state of a mobile terminal according to one embodiment;

FIG. 11, including parts (a)-(c), is a diagram illustrating a change in a size of a display of a mobile terminal according to the present disclosure based on a touch drag direction according to an embodiment of the present disclosure;

FIG. 13, including parts (a) and (b), illustrates diagrams associated with, when a video call is received by a mobile terminal according to the present disclosure, extension of a display of the mobile terminal according to an embodiment of the present disclosure;

FIG. 17, including parts (a) and (b), illustrates a touch operation for controlling a size of a display of a mobile terminal according to an embodiment of the present disclosure;

DETAILED DESCRIPTION OF THE EMBODIMENTS

Description will now be given in detail according to example embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

The terminology used in the present disclosure is used only to describe specific embodiments, not intended to limit the present disclosure. A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
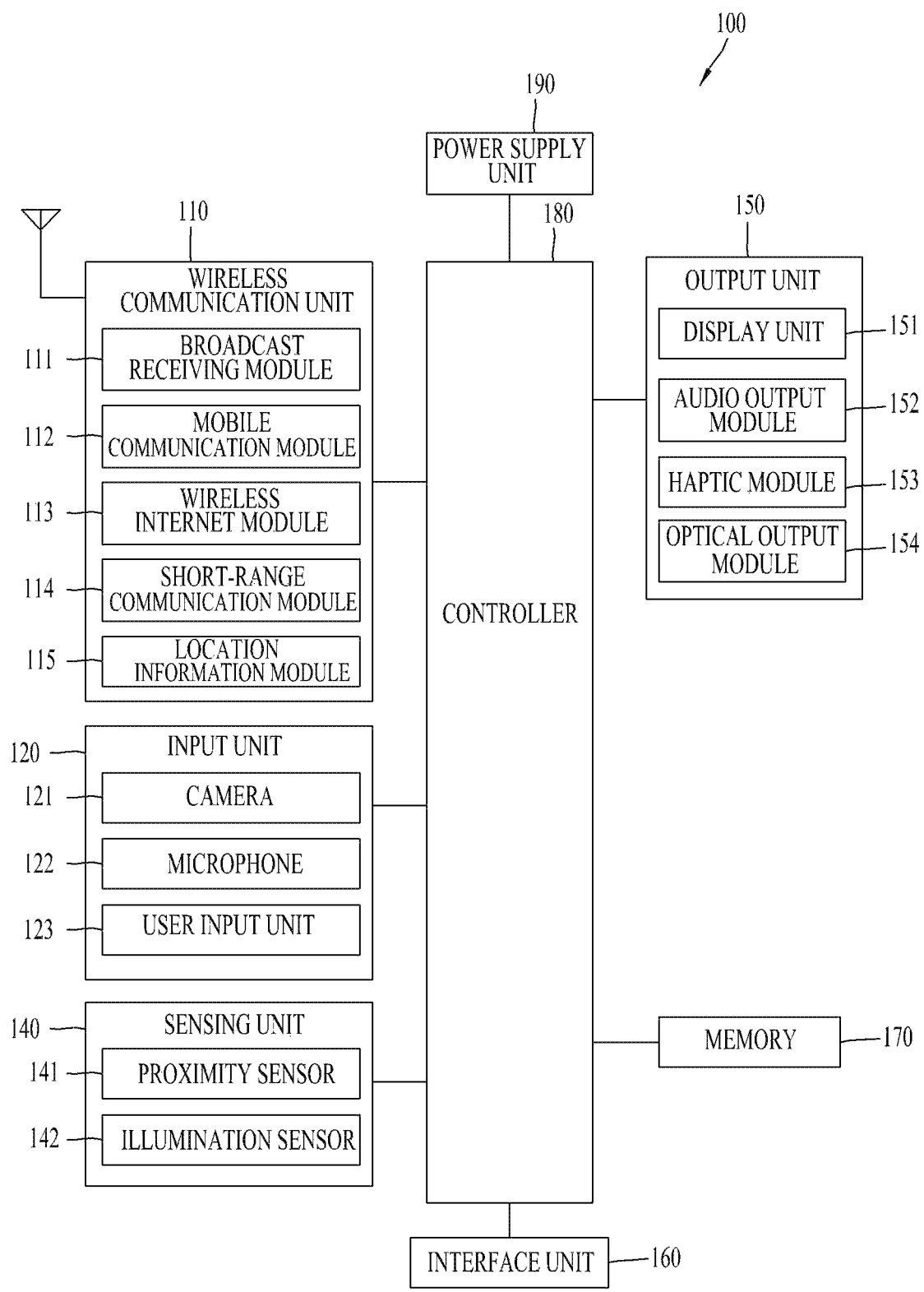
FIG. 1 is a block diagram of a mobile terminal according to an embodiment of the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
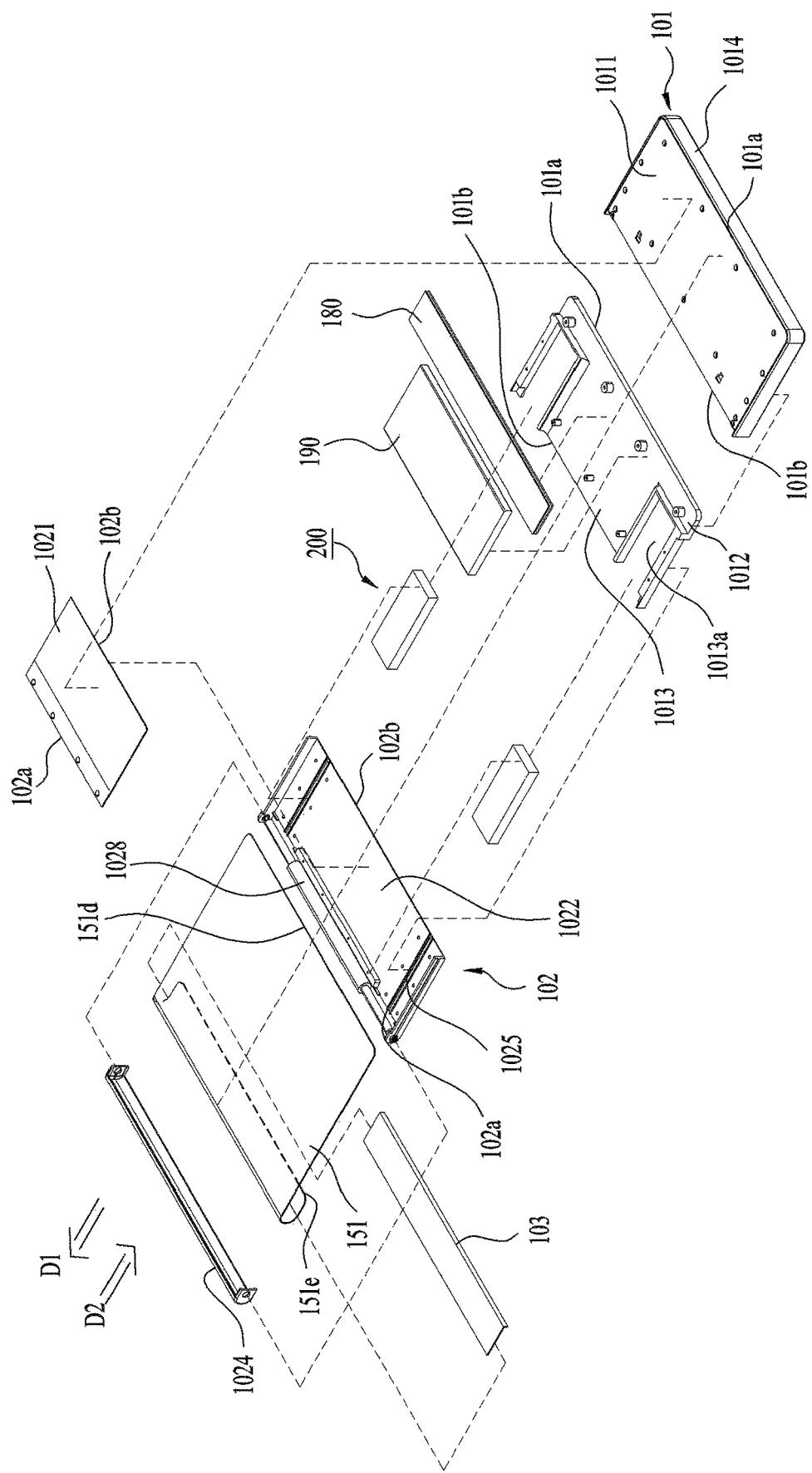
FIG. 2 is an exploded perspective view of a mobile terminal according to one embodiment.
Figure 5:
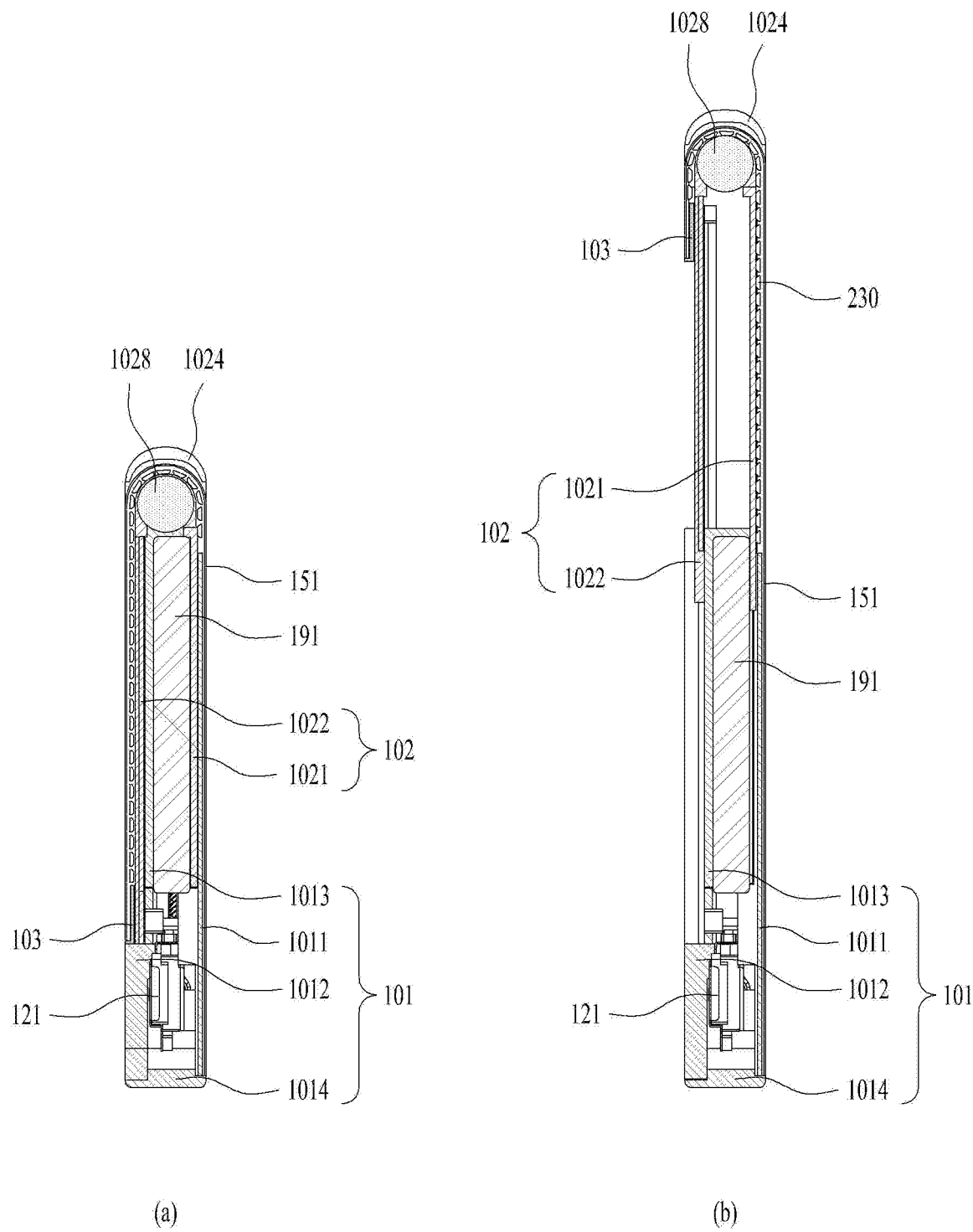
FIG. 5, including parts (a) and (b), shows cross-sectional views respectively taken along a line A-A and a line B-B of FIG. 3 according to an embodiment of the present disclosure.

FIG. 2 is an exploded perspective view of a mobile terminal according to one embodiment. Further, FIG. 3 shows perspective views respectively illustrating a first state and a second state viewed from one side of a mobile terminal according to one embodiment. Further, FIG. 4 shows rear face views respectively illustrating a first state and a second state of a mobile terminal according to one embodiment. Further, FIG. 5 shows cross-sectional views respectively taken along a line A-A and a line B-B of FIG. 3. In these drawings, FIGS. 3 (a), 4 (a), and 5 (a) show a first state of the mobile terminal, and FIGS. 3 (b), 4 (b), and 5 (b) show a second state of the mobile terminal.

As shown, a mobile terminal 100 in a first state is contracted, and has a smaller size than the mobile terminal 100 in a second state. In addition, a size of a display unit 151 located disposed on a front face of the mobile terminal 100 also becomes smaller than that of the display unit 151 in the second state. The mobile terminal 100 of the first state is expanded in a first direction D1 to be in the second state. In the second state, the size of the mobile terminal 100 and a size of a front face of the display unit 151 are larger than those in the first state. In a following description, a direction in which the mobile terminal 100 and the display 151 thereof are extended or enlarged is referred to as a first direction D1, a direction in which the mobile terminal 100 and the display 151 thereof are contracted or retracted, or reduce to be converted into the first state from the second state is referred to as a second direction D2, and a direction perpendicular to the first and second directions D1 and D2 is referred to as a third direction.

The mobile terminal 100 of the present disclosure may be converted from the first state in which the display unit 151 is positioned on the front face of a bar-shaped mobile terminal as shown in FIG. 3 (a) into the second state as shown in FIG. 3 (b) by enlarging a screen thereof. In the second state, an area of the front face of the display unit 151 is enlarged, and an area of a rear face of the display unit 151 is reduced as shown in FIG. 4 (b). That is, the display unit 151 positioned on a rear face of the mobile terminal 151 in the first state moves to the front face of the mobile terminal 100 in the second state.

As such, the display unit may use a flexible display unit 151 that may be bent such that the position of the display unit may be varied. The flexible display is a lightweight, unbreakable, and durable display that is built on a thin and flexible substrate that may be bent, crooked, folded, twisted, or rolled while retaining properties of a conventional flat panel display.

In addition, an electronic paper is a display technology to which properties of general ink are applied. The electronic paper may be different from the conventional flat panel display in using reflected light. The electronic paper may change information using a twisted ball or electrophoresis using a capsule.

In a state in which the flexible display unit 151 is not deformed (e.g., a state of having an infinite curvature radius, hereinafter referred to as a basic state), a display region of the flexible display unit 151 becomes flat. In a state in which the flexible display unit 151 is deformed by an external force from the basic state (e.g., a state of having a finite radius of curvature, hereinafter referred to as a deformed state), the display region may become a curved face. As shown, information displayed in the deformation state may be visual information output on the curved face. Such visual information is implemented by independently controlling light emission of sub-pixels arranged in a matrix. The sub-pixel refers to a minimum unit for implementing one color.

The flexible display unit 151 may be in a curved state (e.g., a vertically or horizontally curved state) rather than a flat state in the basic state. In this case, when the external force is applied to the flexible display unit 151, the flexible display unit 151 may be deformed into the flat state (or a less curved state) or more curved state.

The flexible display unit 151 may be combined with a touch sensor to implement a flexible touch screen. When a touch is made on the flexible touch screen, the controller 180 (see FIG. 1) may perform control corresponding to such touch input. The flexible touch screen may be configured to detect the touch input in the deformed state as well as in the basic state.

The touch sensor detects the touch (or touch input) applied on the touch screen using at least one of various touch schemes such as a resistive film scheme, a capacitance scheme, an infrared scheme, an ultrasonic wave scheme, a magnetic field scheme, and the like.

As an example, the touch sensor may be configured to convert a change in pressure applied on a specific portion of the touch screen, capacitance generated at the specific portion, or the like into an electrical input signal. The touch sensor may be configured such that a touch object applying a touch on the touch screen may detect touched position and area on the touch sensor, a pressure during the touch, a capacitance during the touch, and the like.

Further, the mobile terminal 100 may have a deformation detection means for detecting the deformation of the flexible display unit 151. Such deformation detection means may be included in the sensing unit 140 (see FIG. 1).

The deformation detection means may be disposed in the flexible display unit 151 or a case (first to third frames 101 to 103 to be described later) to detect information related to the deformation of the flexible display unit 151. In this connection, the information related to the deformation may include a direction in which the flexible display unit 151 is deformed, a degree of the deformation, a deformed position, a deformed time, an acceleration at which the deformed flexible display unit 151 is restored, and the like. In addition, the information related to the deformation may be various information that may be detected due to the bending of the flexible display unit 151.

In addition, the controller 180 may change information displayed on the flexible display unit 151 or generate a control signal for controlling a function of the mobile terminal 100 based on the information related to the deformation of the flexible display unit 151 detected by the deformation detection means.

The state conversion (first or second state) of the flexible display unit 151, e.g., the size change at the front and rear faces of the mobile terminal 100 of the display unit 151 based on the size change of the mobile terminal 100 may be performed manually by a force applied by the user, but may be not limited to such manual scheme. For example, when the mobile terminal 100 or the flexible display unit 151 is in the first state, the mobile terminal 100 or the flexible display unit 151 may be converted into the second state by the user or an application command without the external force applied by the user. As such, in order for the flexible display unit 151 to be automatically deformed without the external force, the mobile terminal 100 may include a driving unit 200 to be described later.

The flexible display unit 151 of the present disclosure is bent 180 degrees while being rolled on one of both sides of the mobile terminal 100. Thus, a portion of the display unit 151 is disposed on the front face of the mobile terminal 100 based on such side, and the other portion thereof is disposed on the rear face of the mobile terminal 100. A portion of the display unit 151 located on the front face of the mobile terminal 100 may be fixed to the front face so as not to move. Further, the other portion thereof located on the rear face of the mobile terminal 100 may be movable to the rear face.

In addition, the display unit 151 may be rolled on or released from the side. Accordingly, the portion disposed on the rear face of the mobile terminal 100 moves, so that the size of the portion disposed on the front face of the mobile terminal 100 may be adjusted. Since the area of the flexible display unit 151 is determined and the flexible display unit 151 is formed of one continuous body, an area of the portion on the rear face decreases as an area of the portion on the front face increases. Such a display unit 151 may be rolled in a second frame 102, which is movable relative to a first frame 101 to be described later, more correctly, on one of sides of the second frame 102. The display unit 151 may be withdrawn or pulled out from or inserted or pushed into the second frame 102 while being rolled in the second frame 102 along a moving direction of the second frame 102 to adjust the area of the display unit 151 on the front face of the mobile terminal 100. Such operation will be described in more detail below along with other relevant components of the mobile terminal 100.

Typically, an antenna is disposed in the case or the housing of the mobile terminal 100, but a portion where the antenna is installed in the case or the housing may be limited because of the flexible display unit 151 that covers not only the front face of the mobile terminal 100 but also the rear face thereof. For this reason, the antenna may be implemented on the flexible display unit 151. An antenna on display (AOD) is an antenna in which a transparent film is formed by stacking an electrode layer and a dielectric layer that have patterns engraved thereon, respectively. The antenna on display may be implemented thinner than an antenna implemented using a laser direct structuring (LDS) technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

With reference to FIGS. 2 to 5, a detailed configuration of the mobile terminal 100 of the present disclosure will be described in detail below. A following description will be achieved basically with reference to FIG. 2 illustrating an overall configuration. FIGS. 3 to 5 explain detailed features of corresponding components in the first and second states of the mobile terminal 100.

The mobile terminal 100 of the present disclosure includes a main frame in which components are mounted, and the main frame of the present disclosure may vary in size in the first direction as shown in FIG. 2. One or more frames move relative to each other, and sizes thereof may vary in the first direction. Electronic components are mounted in the main frame, and the flexible display unit 151 is located out of the main frame.

Since the mobile terminal 100 of the present disclosure includes the flexible display unit, the flexible display unit 151 may be combined in a form surrounding a front face and a rear face of the main frame. The main frame may include first to third frames 101 to 103. The main frame may include the first frame 101, the second frame 102 moving in the first direction with respect to the first frame 101, and the third frame 103 moving in the first direction with respect to the second frame 102. The first frame 101 and the second frame 102 include front portions, a rear portions, and side portions, respectively, and are coupled to each other. Thus, the mobile terminal 100 may have a hexahedral outer shape by such coupled first and second frames 101 and 102. In consideration of an illustrated configuration of the first to third frames 101 to 103, movements of the second and third frames 102 and 103 may be a slide movement.

First, the first frame 101 corresponds to a main body of the mobile terminal 100, and may have a space therein for accommodating various components. In addition, the first frame 101 may accommodate the second frame 102 movably coupled to the first frame 101 in such a space. More specifically, as shown in FIGS. 2 and 5, the first frame 101 may include a first front portion 1011 disposed at a front portion of the mobile terminal 100 and a first rear portion 1012 and a second rear portion 1013 disposed at a rear portion of the mobile terminal.

Such first front portion 1011, first rear portion 1012, and second rear portion 1013 may be respectively formed of plate-shaped members that are generally flat. The first rear portion 1012 and the second rear portion 1013 may be respectively formed of separate members coupled to each other or may be formed of one member as shown. The first front portion 1011 and the first rear portion/second rear portion 1012 and 1013 may be spaced apart from each other at a predetermined spacing to define a predetermined space therebetween, and may be connected to each other by a side portion 1014. The controller 180 and the power supply unit 190 may be accommodated as components of the mobile terminal 100 in the space in the first frame 101. For example, the controller 180 may be a circuit board including a processor and an electronic circuit for controlling the operation of the mobile terminal, and the power supply unit 190 may be a battery and related components. In addition, the second frame 102 and the driving unit 200 to described later may also be accommodated in the first frame 101.

As described above, the display unit 151 has the continuous body, and thus, may be disposed on both the front face and the rear face of the mobile terminal 100 while being rolled in the mobile terminal 100. The display unit 151 may include the front face positioned at the front face of the mobile terminal 100, the rear face positioned at the rear face of the mobile terminal 100, and the side face positioned between the front face and the rear face thereof and surrounding the side face of the mobile terminal. The front face and the rear face of the display unit 151 are flat, and the side face of the display unit 151 may form a curved face. When the flexible display unit 151 may be damaged when being bent. Thus, the flexible display unit 151 may be formed to be bent with a predetermined curvature.

The display unit 151 may be divided into a fixed portion and a variable portion. The fixed portion means a portion fixed to the frame. Because of being fixed to the frame, the fixed portion maintains a constant shape without changing a bending degree. On the other hand, the variable portion means a portion in which a bending angle or a position of the bent portion changes. The variable portion in which the position or bending angle of the bent portion changes requires a structure for supporting a rear face of the variable portion in response to the change.

A first region of the display unit 151 may be coupled to the first front portion 1011 corresponding to the front face of the mobile terminal 100.

In one example, as shown in FIG. 4, various physical input units 120 for manipulation of the mobile terminal 100 and sensing units 140 may be located on the first rear portion 1012, and the display unit 151 may be disposed only on the second rear portion 1013. Since the first rear portion 1012 does not overlap the flexible display unit 151 regardless of the state of the mobile terminal, and is always exposed to the outside, the input unit 120 such as various buttons, switches, the camera 121, and a flash, and the sensing unit 140 such as a proximity sensor 141 may be arranged on the first rear portion 1012. In a conventional bar-shaped terminal, a display unit is provided only on a front face of the terminal. Therefore, a main camera is placed on a rear face of the terminal in order for the user to capture an object at an opposite side while looking through the display unit. On the other hand, an additional auxiliary camera is required to be disposed on the front face of the terminal in order for the user to capture himself or herself while viewing himself or herself through the display unit.

However, the display unit 151 is positioned both the front face and the rear face of the mobile terminal 100 of the present disclosure. Therefore, when the user captures himself or herself, a display unit on the same face as the camera 121, that is, the portion of the display 151 on the rear face of the mobile terminal 100 in the drawing may be used. Further, when the user captures the object on the opposite side of the user, a display unit on the opposite face of the camera 121, that is, the portion of the display unit 151 on the front face of the mobile terminal 100 in the drawing may be used. For this reason, the mobile terminal 100 may capture the object on the opposite side of the user and capture the user using the single camera 121. The camera may include a plurality of cameras having different angles of view, such as wide angle, super wide angle, and telephotographic cameras. In addition to the camera, a proximity sensor sound output unit may be positioned on the first rear portion 1012, and an antenna 116 may be installed on the first rear portion 1012.

The side portion 1014 may extend along edges of the first front portion 1011 and the first rear portion/second rear portion 1012 and 1013 to surround the first frame 101, and may form the outer shape of the mobile terminal 100. However, as mentioned above, since the second frame 102 is accommodated in the first frame 101 and is movably coupled thereto, in order to allow the movement of the second frame 102 relative to the first frame 101, a portion of the first frame 101 needs to be opened. As shown in FIG. 2, as an example, the second frame 102 is movably coupled to one of both side portions of the first frame 101, so that the side portion 1014 may not be formed on the same side portion, and thus, the portion of the first frame 101 may be opened. Accordingly, the first frame 101 may include a substantially closed first side portion 101a and a second side portion 101b, which is disposed to be opposite to the first side portion 101a and is opened. The side portion 1014 is exposed to the outside of the mobile terminal 100, so that an interface unit 160 for connecting a supply port or an ear jack, the user input unit 120 such as a volume button, or the like may be disposed on the side portion 1014. When containing a metal material, the side portion 1014 may serve as an antenna.

The second rear portion 1013 of the first frame 101 may be covered by the display unit, but may be disposed on the front face of the display unit using a transparent material.

The second frame 102 may include a second front portion 1021 disposed at the front portion of the mobile terminal 100 and a third rear portion 1022 disposed at the rear portion of the mobile terminal 100. Like the first front portion 1011 and the first rear portion 1012 of the first frame 101, the second front portion 1021 and the third rear portion 1023 may be formed of plate-shaped members that are generally flat. In addition, the second frame 102 also accommodates various components, and should not interfere with the components accommodated in the first frame 101 during the movement. Accordingly, the second front portion 1021 and the third rear portion 1022 may be coupled to each other in a state of being spaced apart from each other to define a predetermined space therebetween, and may have shapes that do not interfere with the components in the first frame 101.

In addition, the display unit 151 may be bent 180 degrees while being rolled in the second frame 102 to be disposed on both the front face and the rear face of the mobile terminal 100. For such an arrangement of the display unit 151, the second frame 102 may include a roller 1028 rotatably disposed therein. The roller 1028 may be disposed at any position inside the second frame 102. However, the display unit 151 should be spread flat on the front face and the rear face of the mobile terminal 100 to provide a good quality screen to the user. Further, for such spread, a proper tension should be provided on the display unit 151. In order to provide the proper tension, the roller 1028 may be disposed at a first directional end of the second frame 102. The roller 1028 may extend in the third direction, and may be rotatably coupled to the second frame 102.

The display unit 151 may be rolled around the roller 1028 while being gently bent with a predetermined curvature. The flexible display unit 151 may include a first face on which a video is output and exposed to the outside and an inner face facing the frame at the opposite side. The roller 1028 may be installed to rotate freely in the second frame 102 while being in contact with the inner face of the display unit 151. Accordingly, the roller 1028 may actually move the display unit 151 in a lateral direction of the mobile terminal 100, that is, in a direction perpendicular to a longitudinal direction. As will be described later, when the second frame 102 slides, because of the tension applied by the second frame 102, the display unit 151 moves to the front face or the rear face of the mobile terminal 100 in different directions (e.g., the first direction D1 or the second direction D2) relative to the second frame 102. The roller 1028 may guide such movement while rotating.

In addition, the roller 1028 is disposed on a first side portion 102a of the second frame 102, and the first side portion 102a actually corresponds to an outermost side portion of the mobile terminal 100. When the first side portion 102a of the second frame 102 is exposed, the display unit 151 rolled on the roller 1028 may be damaged. Accordingly, the second frame 102 may include a side frame 1024 disposed on the first side portion 102a.

The side frame 1024 extends in the longitudinal direction of the second frame 102 to cover the first side portion 102a, thereby protecting the roller 1028 and the display unit 151 rolled thereon. That is, the side frame 1024 covers the side face of the display unit 151, and the side face thereof is located in the third region. The first to third regions are at specified positions on the flexible display unit and do not change in size or position, but the sizes of the front face and the rear face, and the position of the side face are determined based on the state of the main frame.

The first region and the second region correspond to the fixed portion described above, and the third region corresponds to the variable portion described above.

The third region may vary in position depending on the state of the mobile terminal. Because the side face is rolled by the roller, the side face is bent with the predetermined curvature, and an inner face of the side frame may include a curved face corresponding to the curvature of the side face.

Because of the side frame 1024, the second frame 102 may have the substantially closed first side portion 102a, and the side frame 1024 may substantially form the outer shape of the mobile terminal 100 together with the side face 1014 of the first frame 101. In addition, the second frame 102 may include a second side portion 102b that is disposed opposite the first side portion 102a to minimize interference with the components within the first frame 101 during the movement, and is opened.

Such a second frame 102 is movably coupled to the first frame 101, and thus may slide in the predetermined first or second direction D1 or D2 relative to the first frame 101. More specifically, the second frame 102 may be movably coupled to the first frame 101 through the side portion of the first frame 101, more precisely, through the opened second side portion 101b, as shown. More specifically, the second side portion 102b of the second frame is disposed relatively adjacent to the first side portion 101a of the first frame 101 which is closed. Accordingly, the first side portion 102a of the second frame may be disposed to be opposite to the first side portion 101a. Accordingly, the second side portion 102b is inserted into the first frame 101 through the side portion of the first frame, that is, the second side portion 101b thereof. The first side portion 102a is not inserted into the first frame 101 but is always located outside the first frame 101, thereby forming the outer shape of the mobile terminal 100 as described above. However, when necessary, such first side portion 102b of the second frame 102 may also be inserted into the first frame 101.

Because of such positional relationship, the second frame 102 may extend from or contract to the first frame 101 in a direction perpendicular to the longitudinal direction of the mobile terminal 100 or the first frame 101. That is, the first and second directions D1 and D2 may basically be directions perpendicular to the longitudinal direction of the mobile terminal 100 or the first frame 101. Further, the first and second directions D1 and D2 may also be described as the lateral direction or the horizontal direction of the mobile terminal 100 or the first frame 101. In addition, during the movement in the first direction D1, the second frame 102 extends from the first frame 101. Accordingly, the first direction D1 may be a direction in which the second frame 102 moves away from the first frame 101, that is, moves outwardly of the mobile terminal 100 or the first frame 101. On the other hand, during the movement in the second direction D2, the second frame 102 contracts to the first frame 101. Thus, the second direction D2 is a direction opposite to the first direction D1, so that the second direction D2 may be a direction in which the second frame 102 moves to become closer to the first frame 101, that is, moves inwardly of the mobile terminal 100 or the first frame 101. When being moved in the first direction D1, such second frame 102 extends and applies a force to the portion of the display unit 151 disposed on the rear face of the mobile terminal 100, so that the portion of the display unit 151 may be disposed on the front face of the mobile terminal 100, and a region for such additional arrangement may be defined. Thus, the second frame 102 may convert the mobile terminal 100 into the second state with the display unit 151 with the relatively extended front face by moving in the first direction D1. On the other hand, when being moved in the second direction D2, the second frame 102 contracts into an original state thereof, and applies a force to the portion of the display unit 151 disposed on the front face of the mobile terminal 100 to return to the rear face of the mobile terminal 100 again. Thus, the second frame 102 may convert the mobile terminal 100 into the first state with the display unit 151 with the relatively contracted front face by moving in the second direction D2. Accordingly, the second frame 102 selectively exposes the display unit 151 to the front face of the mobile terminal 100 depending on the moving direction (e.g., the first or second direction D1 and D2). Accordingly, the mobile terminal 100 may be converted into the first or second state defined above.

During the expansion and the contraction in such first and second directions D1 and D2, the second frame 102 may overlap the first frame 101, more precisely, the first front portion 1011 and the first rear portion 1012 thereof so as not to interfere with the first frame 101. More specifically, the display unit 151 may be coupled to and supported by the first front portion 1011 of the first frame 101, as described above. Accordingly, the display unit 151 does not need to be additionally supported by the second front portion 1021 of the second frame 102. Rather, when the second front portion 1021 is interposed between the first front portion 1011 and the display unit 151, the display unit 151 may be deformed or damaged because of friction with the second front portion 1021, which is repeatedly moved. Thus, the second front portion 1021 may be disposed below the first front portion 1011, as shown in FIG. 5. That is, a front face of the second front portion 1021 may face the rear face of the first front portion 1011. In addition, the rear face of the first front portion 1011 may be in contact with the front face of the second front portion 1021 to stably support the movement of the second frame 102.

The third rear portion 1022 of the second frame 102 may be disposed below the second rear portion 1013 of the first frame 101. That is, the front face of the third rear portion 1022 may face the rear face of the second rear portion 1013. In addition, the rear face of the second rear portion 1013 may be in contact with the front face of the third rear portion 1022 to stably support the movement of the second frame 102. Because of such arrangement, the third rear portion 1022 may be exposed to the outside of the first frame, more precisely, of the second rear portion 1013, and may be coupled to the display unit 151.

Alternatively, when the second rear portion 1013 is made of a transparent material, the second rear portion 1013 may form an outer shape of the rear face of the mobile terminal. The second rear portion 1013 may be positioned rearward of the third rear portion 1022 of the second frame, and the flexible display unit may be disposed between the second rear portion 1013 and the third rear portion 1022 in the first state.

When the second rear portion 1013 is made of a material such as a transparent glass to form the outer shape of the rear face of the mobile terminal, the first rear portion 1012 may be implemented using the same member as the second rear portion 1013. That is, the camera 121, the flash or the sensing unit 140, and the like may be arranged by partially coating the plate-shaped member of the transparent glass material to not allow the internal components to be visible and by not coating only a required portion.

In addition, the second frame 102 may expand and contract the size of the mobile terminal 100 itself, particularly the front face of the mobile terminal 100 by the expansion and the contraction in the first and second directions D1 and D2. Thus, the display unit 151 should move by such extended or reduced front face size to obtain the intended first and second states. However, when being fixed to the second frame 102, the display unit 151 may not be moved smoothly to be adapted for the front face of the mobile terminal 100 that is expanded or contracted. For this reason, the display unit 151 may be movably coupled to the second frame 102. More specifically, the display unit 151 may include a first side edge (or side end) 151d disposed on the front face of the mobile terminal 100 and a second side edge 151e opposite to the first side edge 151d and disposed on the rear face of the mobile terminal 100. The first side edge 151 may be disposed on the front face of the first frame 101, that is, the front face of the first front portion 1011 thereof, and may be disposed adjacent to the side portion of the mobile terminal 100, that is, the first side portion 101a of the first frame. On the other hand, since the second side edge 151e is adjacent to the rear face of the mobile terminal 100 and the third rear portion 1022 of the second frame 102, the second side edge 151e may is be coupled the third rear portion 1022 of the second frame 102 to be movable in the first and second directions D1 and D2. In addition, since the display unit 151 is not structurally strong, a third frame 103 may be coupled to the second side edge 151e. The third frame 103 may be formed of a plate-shaped member extending in the longitudinal direction of the mobile terminal 100. Accordingly, the third frame 103 may be coupled to the second frame, that is, the third rear portion 1022 thereof to be movable in the first and second directions D1 and D2 instead of the second side edge 151e. In addition, the second frame 102 may include a slot 1025 extending in the lateral direction of the mobile terminal 100 or the second frame 102, that is, the direction perpendicular to the longitudinal direction thereof. Further, the third frame 103 may be stably moved while being guided by the slot 1025. The third frame 103 may include, for example, a projection inserted into the slot 1025 for the movement along the slot 1025.

Referring to FIGS. 3 to 5, in connection with such configuration of the first to third frames 101, 102, and 103, the display unit 151 may include a first region 1511 extending from one side thereof, that is, the first side edge 151d toward the second side edge 151e by a predetermined length, and a second region 1512 disposed opposite the first region 1511, and extending from the second side edge 151e toward the first side edge 151d by a predetermined length. In addition, the display unit 151 may include a third region 1513 disposed between the first and second regions 1511 and 1512. Such first to third regions 1511, 1512, and 1513 may be connected to each other, and may form a continuous body of the display unit 151. In addition, as described above, for the movement of the third region 1513 toward the front face or the rear face of the mobile terminal 100 depending on the moving direction of the second frame 102, the first region 1511 may be fixed so as not to move to the front face of the mobile terminal 100, and the second region 1512 may be provided to be movable on the rear face of the mobile terminal. Such configuration of the display unit 151 will be described in more detail below.

The first region 1511 may be disposed on the front face of the mobile terminal 100, more specifically, the first frame 101, that is, on the front face of the first front portion 1011. The first region 1511 is fixed to the first frame 101, that is, the front face of the first front portion 1011 so as not to be moved during the movement of the second frame 102, and thus, the first region 1511 may always be exposed to the front face of the mobile terminal 100. The third region 1513 may be adjacent to the first region 1511, and may extend into the second frame 102 and rolled on the roller 1028. The third region 1513 may consecutively extend out of the second frame 102 again and partially cover the second frame 102, that is, the rear face of the third rear portion 1022. Further, the second frame 102, that is, the third rear portion 1022, is adjacent to the first frame 101, that is, the second rear portion 1013 and together forms the rear case of the mobile terminal 100, so that it may be described that the third region 1513 is also disposed on the rear face of the first frame 101.

The second region 1512 may be adjacent to the third region 1513 and may be disposed on the rear face of the mobile terminal 100, more specifically, on the second frame, that is, the rear face of the third rear portion 1022 thereof. The second region 1512 may be coupled to the third frame 103 without being directly coupled to the second frame 102. As shown in FIG. 4 (b), the slot 1025 extending in the lateral direction (e.g., the direction perpendicular to the longitudinal direction of the mobile terminal 100) to the second frame 102, that is, to the third rear portion 1022 is defined. Further, the third frame 103 may move along the slot 1025. In FIG. 4 (b), it is shown that the slot 1025 is defined in the rear face of the second frame 102, but may be defined in the side face of the second frame 102. Although the second region 1512 may move in the first or second direction D1 or D2 with respect to the second frame 102 together with the third frame 103, the movement of the second region 1512 may be restricted within the rear face of the mobile terminal 100 by the slot 1025. That is, the second region 1512 does not move out of the second frame 102 even when the second frame 102 is extended or contracted, and may move along the slot 1025 within the second frame 102 by the extended or contracted distance of the second frame 102. Accordingly, the second region 1512 may always be exposed to the rear face of the mobile terminal 100.

As a result, the first region 1511 may be disposed on the front face of the mobile terminal 100 and may be always exposed to the front face regardless of the movement of the second frame 102, and the second region 1512 may be disposed on the rear face of the mobile terminal 100 and may be always exposed to the rear face regardless of the movement of the second frame 102. In addition, the third region 1513 may be disposed between the first and second regions 1511 and 1512, and may be selectively placed on the front face or the rear face of the mobile terminal 100 depending on the moving directions D1 and D2 of the second frame 102.

Because of such selective placement of the third region 1513, as shown in FIG. 4 (b), the second rear portion 1013 of the first frame 101 is covered by the second and third regions 1512 and 1513 and the third rear portion 1022 of the display unit 151 in the first state, but the third region 1513 moves to the front face of the mobile terminal 100 in the second state, and the third rear portion 1022 also moves in the first direction D1, so that the mobile terminal 100 may be exposed to the outside. In addition, the second front portion 1021 of the second frame 102 is disposed below the first front portion 1011 of the first frame 101 in the first state, but is moved out of the first frame 101 and supports the third region 1513 of the display unit 151 disposed on the front face of the mobile terminal 100 in the second state.

Since the first and second regions 1511 and 1512 are always respectively arranged on the front face and the rear face of the mobile terminal 100, curvatures of the first region 1511 and the second region 1512 do not change, and the first region 1511 and the second region 1512 may be maintained in a flat basic state. However, the third region 1513 may be rolled on the roller 1028 and bent in the second frame 102. When converting from the first state to the second state, the third region 1513 may extend from the second frame 102 to the front face of the mobile terminal 100 while being rolled on the roller 1028 in one direction. On the other hand, when converting from the second state to the first state, the third region 1513 may be retracted from the front face of the mobile terminal 100 to the second frame 102 while being rolled on the roller 1028 in the opposite direction, and at the same time, may return to the rear face of the mobile terminal 100 from the second frame 102. A specific location of the foldable mobile terminal in a form of being spread like a book is easily damaged because only the specific location is folded repeatedly. On the other hand, the deformed portion of the flexible display unit 151, that is, a portion rolled on the roller 1028, may vary based on the first and second states of the mobile terminal 100, that is, the movement of the second frame 102. Accordingly, the mobile terminal 100 of the present disclosure may significantly reduce deformation and fatigue repeatedly applied to a specific portion of the display unit 151, thereby preventing damage to the display unit 151.

Based on the above-described configuration, overall operations of the mobile terminal 100 will be described as follows. As an example, the state conversion may be performed manually by the user, and an operation of the mobile terminal 100 during such manual state conversion will be described. However, operations of the first to third frames 101 to 103 and the display unit 151, which will be described below, may be performed in the same manner when a power source other than a user's force is used, for example, when the driving unit 200 to be described below is applied.

As shown in FIGS. 3A, 4A, and 5A, the second frame 102 is fully retracted into the first frame 102 in the first state. Therefore, only the first region 1511 of the display unit 151 fixed to the front face of the first frame 101 may be exposed to the front face of the mobile terminal 100. Such first region 1511 may be fixed and supported to the first frame 101, that is, the first front portion 1011 thereof. In addition, a major portion of the third region 1513 may be disposed on the rear face of the mobile terminal 100 together with the second region 1512, and the third region 1513 may be disposed in the second frame 102 while being partially rolled on the roller 1028. The third region 1513 of the rear face of the mobile terminal 100 may be supported by the second frame, that is, the third rear portion 1022 thereof. The second region 1512 may be fixed by the third frame 103 disposed on the second frame (e.g., the third rear portion 1022) and may be movably coupled to the second frame 1012.

In such first state, when the second frame 102 moves in the first direction D1, the mobile terminal 100 may be converted into the second state. As shown in FIGS. 3B, 4B, and 5B, the second frame 102 may extend from the first frame 101 by the movement in the first direction D1, and may increase the overall size of the mobile terminal 100, in particular, the front face thereof. During the movement in the first direction D1, the second frame 102 may apply a force, that is, a tension, to the display unit 151 in the first direction D1. The display unit 151 is fixed to the first frame 101 but is coupled to the second frame 102 to be movable using the third frame 103, so that the force applied by the second frame 102 allows the third region 1513 to be rolled out from the roller 1028 of the second frame 102 to the front face of the mobile terminal 100. That is, the third region 1513 may be withdrawn (or pulled out) from the second frame 102 or extend to (or move out of) the second frame 102. At the same time, the third region 1513, particularly, the portion located on the rear face of the third region 1513 may be rolled into the roller 1028 of the second frame 102 from the rear face, or may be inserted (or pushed in), retracted, or moved into the second frame 102. Not an entirety of the third region 1513 is withdrawn from the second frame 102 to the front face of the mobile terminal 100, and a portion of the third region 1513 may be disposed in the second frame 102 while still being rolled on the roller 1028. In addition, for the smooth movement of the third region 1513, the second region 1512 may also move in the first direction D1 with respect to the second frame 102 together with the third frame 103. In addition, as described above, the second region 1512 and the third frame 103 may be constrained to the second frame 102 and move in the first direction D1 with respect to the first frame 101 together with the second frame 102. Accordingly, the second region 1512 and the third frame 103 may move in the first direction D1 relative to the first frame 101 as well as the second frame 102, and accordingly, move a distance longer than the moved distance of the second frame 102. Thus, because of such long distance movement in the first direction D1 of the second region 1512, the third region 1513 may be smoothly extended to the front face of the mobile terminal 100. Further, for the movement of the third region 1513, which is proportional to the expansion of the second frame 102, the movement of the second region 1512 and the third frame 103 in the first direction D1 may be performed simultaneously with the movement of such third region 1512 and second frame 102 in the first direction D1 to be proportional to the movement of third region 1513 and second frame 102.

When the second frame 102 is fully extended in the first direction D1, the first and third regions 1511 and 1513 may be arranged on the front face of the mobile terminal 100, and only the second region 1512 may be disposed on the rear face of the mobile terminal 100. Such first and third regions 1511 and 1513 may be supported by the first frame (e.g., the first front portion 1011 thereof) and the second frame (e.g., the second front portion 1021 thereof). In addition, the second frame 102, e.g., the third rear portion 1022 thereof exposes the second rear portion 1013 of the first frame while extending in the first direction D1, and supports the moving third region 1513. Therefore, in the second state, the mobile terminal 100 may have the extended front face display unit 151.

On the other hand, when the second frame 102 moves in the second direction D2 in the second state, the mobile terminal 100 may again return into the first state as shown in FIGS. 3A, 4A, and 5A. The second frame 102 may be contracted to the first frame 101 by the movement in the second direction D2, and may reduce the overall size of the mobile terminal 100, particularly the front face thereof. The movement of the display unit 151 during such movement of the second frame 102 may be performed in a reverse order of the movement in the first direction D1 described above. In brief, the third region 1513 may be rolled from the front face of the mobile terminal 100 into the roller 1028 of the second frame 102, or may be inserted, retracted, or moved into the second frame 102. At the same time, the third region 1513 may be rolled, withdrawn, extended, or moved out of the roller 1028 of the second frame 102 to the rear face of the mobile terminal 100. Not the entirety of the third region 1513 may be withdrawn from the second frame 102 to the rear face of the mobile terminal 100, and the portion of the third region 1513 may still be placed in the second frame 102 while still being rolled on the roller 1028. In addition, for such smooth movement of the third region 1513, the second region 1512 may also move in the second direction D2 with respect to the second frame 102 together with the third frame 103. The second region 1512 and the third frame 103 may be constrained to the second frame 102 to move in the second direction D2 with respect to the first frame 101 together with the second frame 102. Accordingly, the second region 1512 and the third frame 103 may move relatively in the second direction D2 with respect to not only the second frame 102 but also the first frame 101. As a result, the second region 1512 and the third frame 103 may move in the second direction D2 a distance larger than the moved distance of the second frame 102. Thus, because of such long distance movement of the second region 1512, the third region 1513 may be smoothly returned to the rear face of the mobile terminal 100. Further, for the movement of the third region 1513 proportional to the contraction of the second frame 102, the movements of the second region 1512 and the third frame 103 in the second direction D2 may be performed simultaneously with the movements of the third region 1512 and the second frame 102 in the second direction D2 to be proportional to the movements of the third region 1513 and the second frame 102. When the second frame 102 is completely contracted in the second direction D2, the mobile terminal 100 may be converted into the first state as described above, and may have the display unit 151 with the front face that is relatively reduced in comparison with the second state in the first state.

Figure 6:
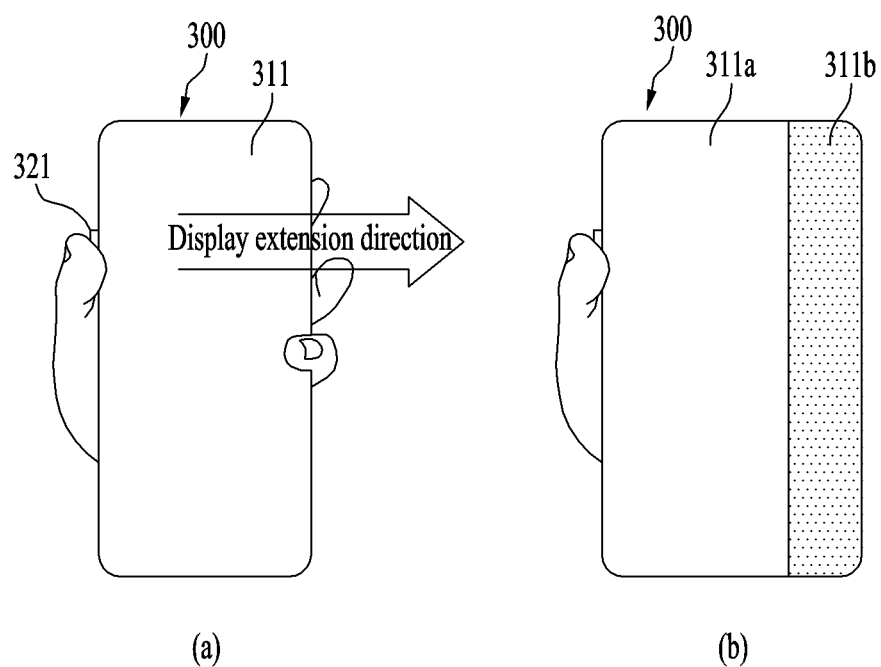
FIG. 6, including parts (a) and (b), is a diagram illustrating a problem when a display of a mobile terminal is automatically extended through a physical key.

FIG. 6 is a diagram illustrating a problem when a display of a mobile terminal is automatically extended through a physical key.

In a mobile terminal 300 capable of extending a display 311, the display 311 may be automatically extended using a physical key 321 as a convenient control method for the extension. However, in a process in which a user presses the physical key 321 and the display 311 located on a front face of the mobile terminal 300 is extended as shown in (a) in FIG. 6, a center of gravity of the mobile terminal 300 may be moved.

FIG. 6 (b) is a diagram illustrating a state in which the display of the mobile terminal 300 is expanded by the physical key 321. The display includes a fixed display 311a in which a size thereof in (a) in FIG. 6 does not change and an extended display 311b extended by the physical key 321.

As shown in (b) in FIG. 6, as the display of the mobile terminal is extended in one direction of a user's hand that grips the mobile terminal 300, a center of gravity of the mobile terminal 300 may be changed, and it may be difficult for a portion of the user's hand that supports the mobile terminal 300 to support the mobile terminal 300 anymore. Accordingly, the mobile terminal 300 may be departed from the user's hand.

The physical key may be disposed in consideration of a grip position of the user's hand. When the physical key is disposed at a position in (a) in FIG. 6, as described above, the support of the mobile terminal 300 may become unstable, and it is difficult to dispose the physical key in the extending direction in terms of mechanical characteristics. In addition, disposing the physical key on a top face or a bottom face of the mobile terminal 300 may cause inconvenience to the user.

Therefore, there is a need for a mobile terminal of a new type for stably changing a size of a screen in the mobile terminal capable of extending the display.

Hereinafter, the mobile terminal of the new type will be described in FIGS. 7 to 19.

Figure 7:
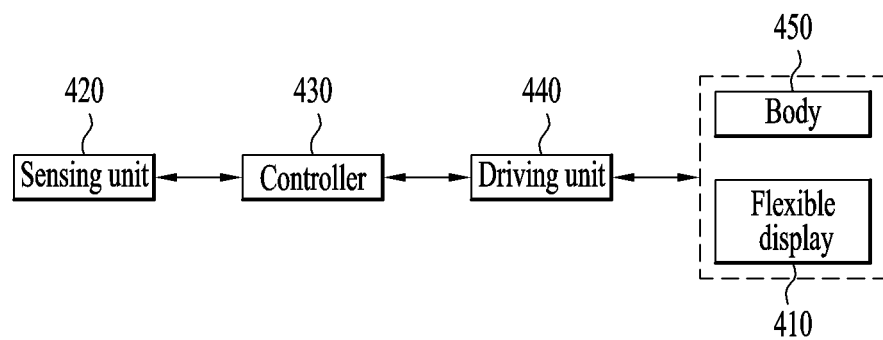
FIG. 7 is a block diagram illustrating a method for controlling a mobile terminal according to an embodiment of the present disclosure.

FIG. 7 is a block diagram illustrating a method for controlling a mobile terminal according to the present disclosure.

A mobile terminal according to the present disclosure includes a body 450 having a variable size, a flexible display 410 including a first display located on a front face of the body 450 and a second display located on a rear face of the body 450, a driving unit 440 for changing the size of the body 450 and a size of the first display, a sensing unit 420 for sensing an input signal, and a controller 430 for controlling the driving unit 440 to change the size of the body 450 and the size of the first display when the input signal is a signal having a value equal to or greater than a threshold value. In addition, a total area of the flexible display 410 including the first display and the second display is constant, the flexible display 410 is characterized in that a size of the second display is correspondingly reduced as a size of the first display increases.

Thus, as shown in FIG. 7, when the input signal having the value equal to or greater than the threshold is sensed by the sensing unit 420, the signal may be transmitted to the controller 430, and the controller 430 may control the driving unit 440 to change sizes of the body 450 and the first display of the flexible display 410. In addition, at least one of a variety of signals, such as a touch signal, a force signal, and the like may be selected as the input signal. The input signal may be preset when releasing the mobile terminal or may be separately set by the user. In one example, the flexible display 410 may be regarded as having the same function as the flexible display 151 mentioned in FIGS. 3 and 4.

Figure 8:
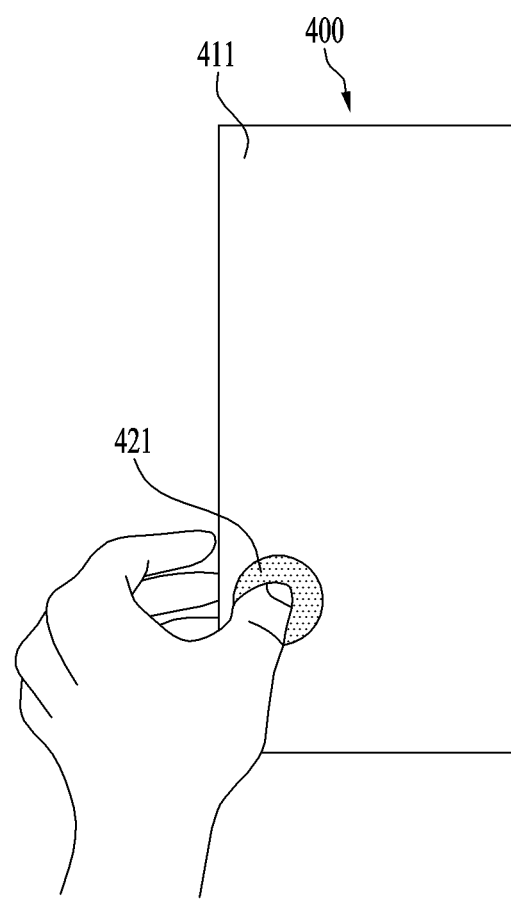
FIG. 8 is a diagram illustrating a touch operation for controlling a size of a display of a mobile terminal according to an embodiment of the present disclosure.

FIG. 8 is a diagram illustrating a touch operation for controlling a size of a display of a mobile terminal according to the present disclosure.

A first display 411 positioned on a front face of the mobile terminal 400 according to the present disclosure illustrated in FIG. 8 may include a touch sensor. Therefore, when a specific region of the first display 411 is touched, whether the threshold value is satisfied may be determined based on a touch region 421 to determine whether to extend the first display 411 of the mobile terminal 400. In this connection, the input signal for extending the display may be a touch signal, and the threshold value may be determined based on a touch area. The touch area, which is the threshold, may be basically set when releasing the mobile terminal or may be arbitrarily reset by the user.

As shown in FIG. 8, the user grips some regions of front and rear faces of the mobile terminal 400 including one side of the mobile terminal 400, thereby stably supporting the mobile terminal 400 even when the screen is extended in a direction of the other side of the mobile terminal 400. In addition, it is possible to support the mobile terminal 400 with one hand by determining whether to extend the display by touching the first display 411 located on the front face instead of a physical key at a side portion of the mobile terminal 400. For example, in a case of the extension of the display using the physical key illustrated in FIG. 6, in order to press the physical key, the user's hand grips the mobile terminal while surrounding both side portions of the mobile terminal. In this case, when the display of the mobile terminal is extended in one direction, grip at one side portion that is extending may become unstable. On the other hand, the mobile terminal 400 in FIG. 8 is able to extend the display through the touch of the first display 411 located on the front face, and accordingly, the user may grip only the region including one side portion from the beginning. Thus, in the process of extending the display, the mobile terminal 400 may be stably supported.

Figure 9:
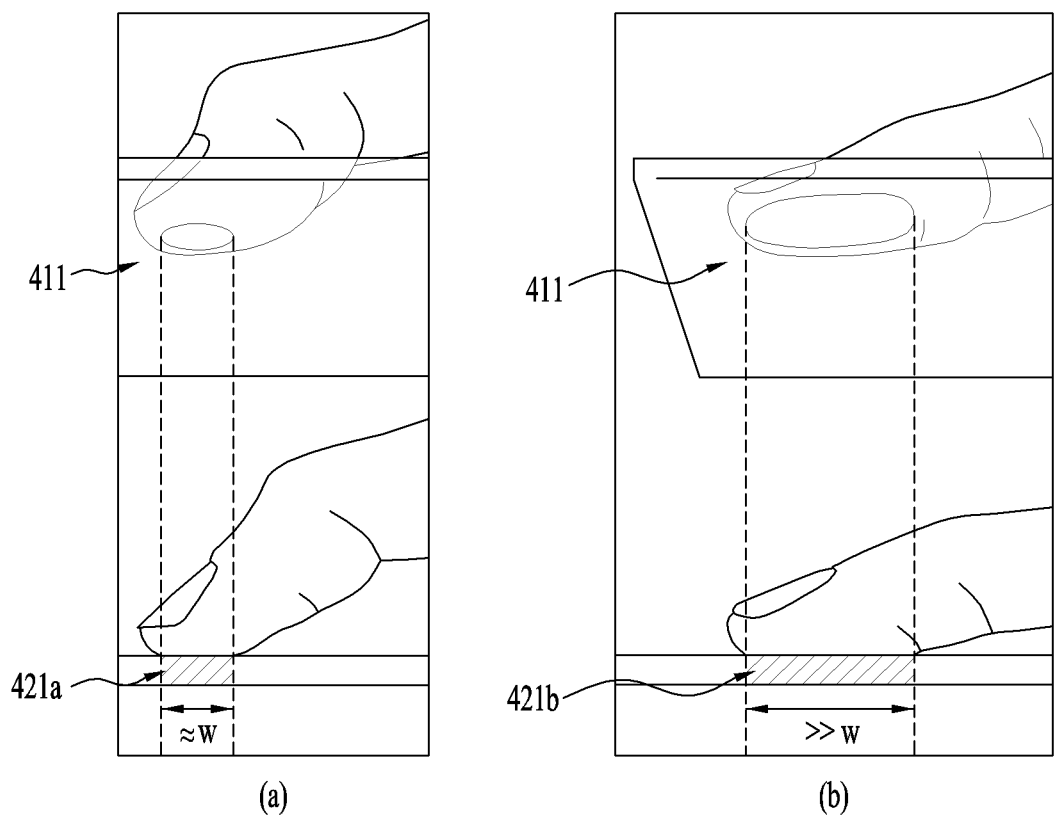
FIG. 9, including parts (a) and (b), is a diagram illustrating a condition for a touch operation of FIG. 8 to have a value equal to or greater than a threshold value according to an embodiment of the present disclosure.

FIG. 9 is a diagram illustrating a condition for a touch operation of FIG. 8 to have a value equal to or greater than a threshold value.

In the mobile terminal, additional care is required when the touch area by the touch operation becomes the threshold value for determining whether to extend the display. In general, the display of the mobile terminal includes a touch sensor, and even a conventional mobile terminal performs a specific function through various touch or touch drag operations, so that it is preferable that the touch area, which is the threshold value in the present disclosure, avoids collision with conventional touch operations.

FIG. 9 (*a*) illustrates an area of the first display 411 on the front face generally touched by the user when the user performs various activities on a mobile terminal. As shown in the drawing, a touch area 421*a* may be an area of a region of the first display 411 where a portion of a finger joint that is touching touches.

On the other hand, as shown in (b) in FIG. 9, when the user consciously wants to touch a large region of the first display 411 located on the front face, a touch area 421*b* may be an area of a region of the first display 411 where most of the finger joint that is touching touches.

Therefore, an area difference between the touch areas 421*a* and 421*b* may be distinguished and may be used as the threshold value for determining whether to extend the display of the mobile terminal.

In one example, in order to have a difference in the touch area using the same finger, the user consciously adjusts the touch area. However, when using different fingers, the difference in the touch area may naturally occur. For example, when the user is the same, areas of a thumb and another finger may be noticeably different. Therefore, when touching using the thumb, the threshold value for extending the display may be set based on an average touch area.

In one example, a size of the finger, the touch area, and the like may be different for each user, so that the user may set the touch area to be suitable for the user using the controller of the mobile terminal.

Figure 10:
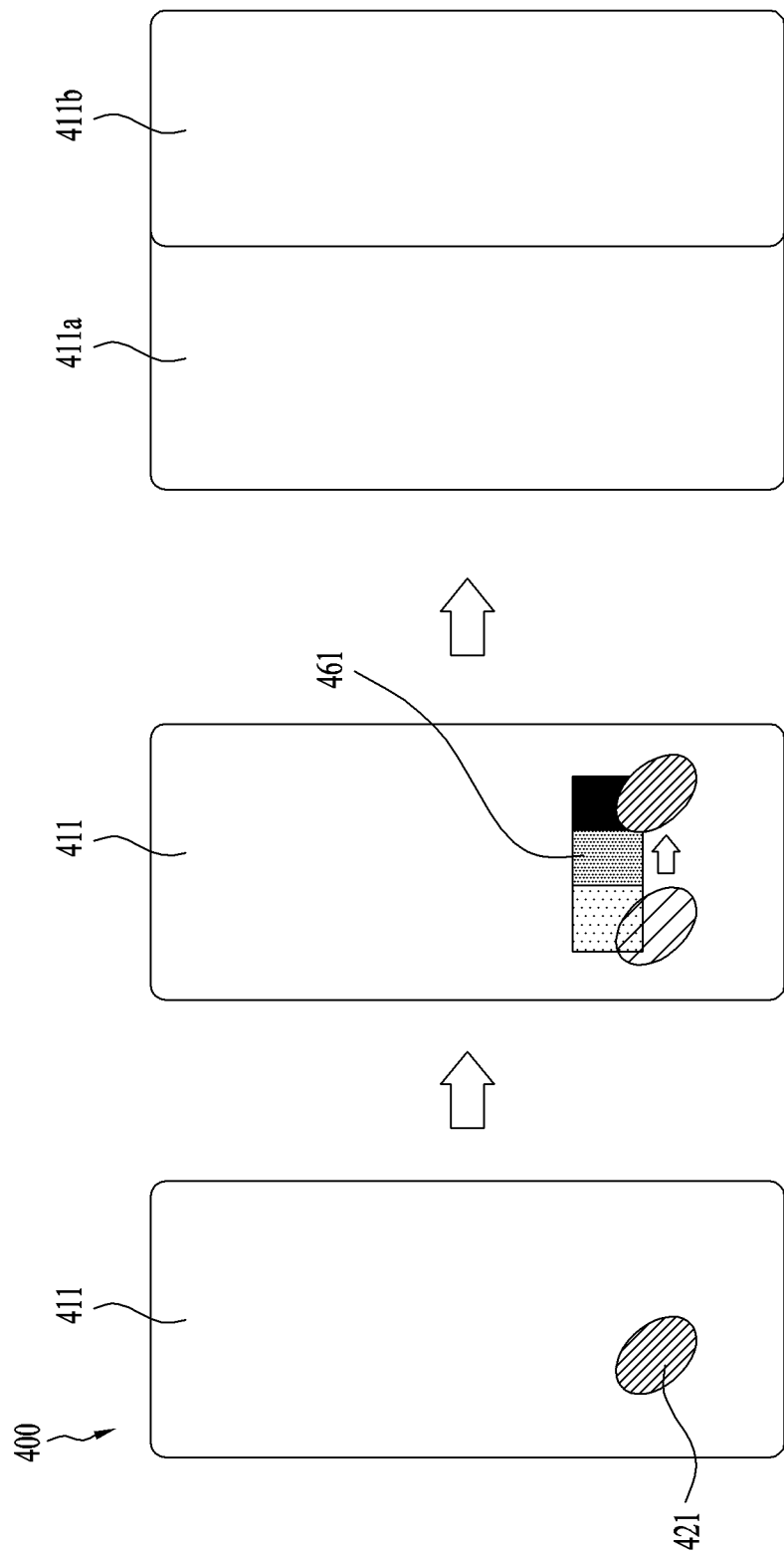
FIG. 10 is a diagram illustrating a selection menu displayed on a screen when there is an input signal having a value equal to or greater than a threshold value, and extension of a display of a mobile terminal associated with the selection menu according to an embodiment of the present disclosure.

FIG. 10 is a diagram illustrating a selection menu displayed on a screen when there is an input signal having a value equal to or greater than a threshold value, and extension of a display of a mobile terminal associated with the selection menu.

FIG. 10 illustrates a selection menu 461 displayed on the first display 411 when the touch area 421 is equal to or greater than the threshold value in a case in which the input signal of the mobile terminal 400 is the touch signal.

The selection menu 461 may display a menu for determining whether to extend the first display 411 on the first display 411. In addition, the selection menu 461 may be displayed to overlap with the region 421 where the user touches the first display 411 as shown in FIG. 10.

When the user chooses to extend the first display 411, the first display 411 located on the front face of the mobile terminal 400 may include a fixed first fixed display 411*a* having a size fixed without being changed, and a first extended display 411*b* in which the screen is extended. As will be described later, the first extended display 411*b* may be extended to a plurality of sizes. Therefore, the first display 411 including the first extended display 411*b* may also be extended to a plurality of sizes. In addition, as described above with reference to FIGS. 2 to 5, the mobile terminal according to the present disclosure is the rollable mobile terminal, which has a feature in that the display on the rear face is reduced by a size corresponding to an extended size of the display on the front face.

FIG. 11 is a diagram illustrating a change in a size of a display of a mobile terminal according to the present disclosure based on a touch drag direction.

When the touch area is equal to or greater than the threshold value, and when whether to extend the display is determined by selecting one in the selection menu in FIG. 10, whether to extend the display may be determined based on the touch drag direction.

As shown in (a) in FIG. 11, when performing touch drag from the first display 411 located on the front face of the mobile terminal 400 in a first direction 422*a*, the first display 411 of the mobile terminal 400 may include the first fixed display 411*a* and may be extended by a size of the first extended display 411*b* in the first direction 422*a*.

The first direction 422*a* is the same as an extension direction by a mechanical design of the mobile terminal 400. However, the first direction 422*a* does not need to be a clear straight line as shown, and is available when the first direction 422*a* is similar to the extension direction when comparing final positions thereof with each other based on an initial position of the touch drag. For example, touch drag of a curved line is also available. A degree of similarity may be preset when releasing the mobile terminal, and may be corrected later using the controller of the mobile terminal.

FIG. 11 (*b*) is a diagram illustrating a case in which touch drag is performed in a second direction 422*b* to reduce the extended display on the previously extended mobile terminal 400. An extended region of the first display 411 located on the front face of the mobile terminal 400 may be reduced, and may be finally reduced to a size of the first fixed display 411a. The second direction 422b is the same as a reduction direction by the mechanical design of the mobile terminal 400. However, the second direction 422b does not need to be a clear straight line as shown, and is available when the second direction 422b is similar to the reduction direction when comparing final positions thereof with each other based on an initial position of the touch drag. For example, touch drag of a curved line is also available. A degree of similarity may be preset when releasing the mobile terminal, and may be corrected later using the controller of the mobile terminal.

When (a) in FIG. 11 illustrates a case in which the mobile terminal is gripped at a general position, (c) in FIG. 11 illustrates a case in which the mobile terminal 400 is gripped at a different position. Also in this case, when the touch drag is performed in the first direction 422a on the first display 411 of the mobile terminal 400, the first display 411 of the mobile terminal 400 may include the first fixed display 411a, and may be extended by the size of the first extended display 411b.

In one example, FIGS. 10 and 11 illustrate the determination of whether to extend the display based on the selection menu or the touch drag direction after the determination of the threshold value based on the touch area at the moment when the user touches the display located on the front face of the mobile terminal.

On the other hand, the touch area as the threshold value may be set as a total touch area from a moment of touching the first display located on the front face of the mobile terminal to a time point when the touch ends on the screen by dragging the touch. That is, the threshold value may be determined based on the total area of contact with the touch sensor when the user inputs the touch drag on the first display. Finally, the threshold value may be determined based on the total area, and when the total area is equal to or greater than the threshold value, whether to change a size of the display may be controlled based on the touch drag direction simultaneously.

Figure 12A:
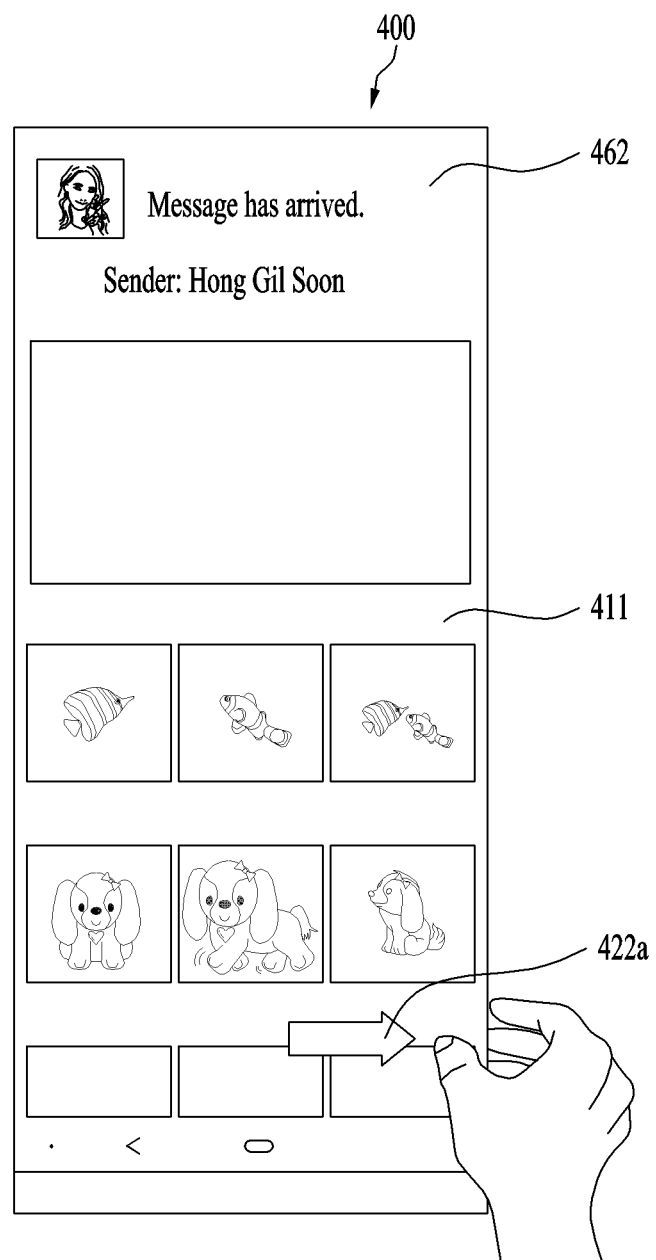
FIGS. 12a to 12c are diagrams for illustrating, when a message is received by a mobile terminal according to the present disclosure, a method for extending a display of the mobile terminal according to an embodiment of the present disclosure.
Figure 12B:
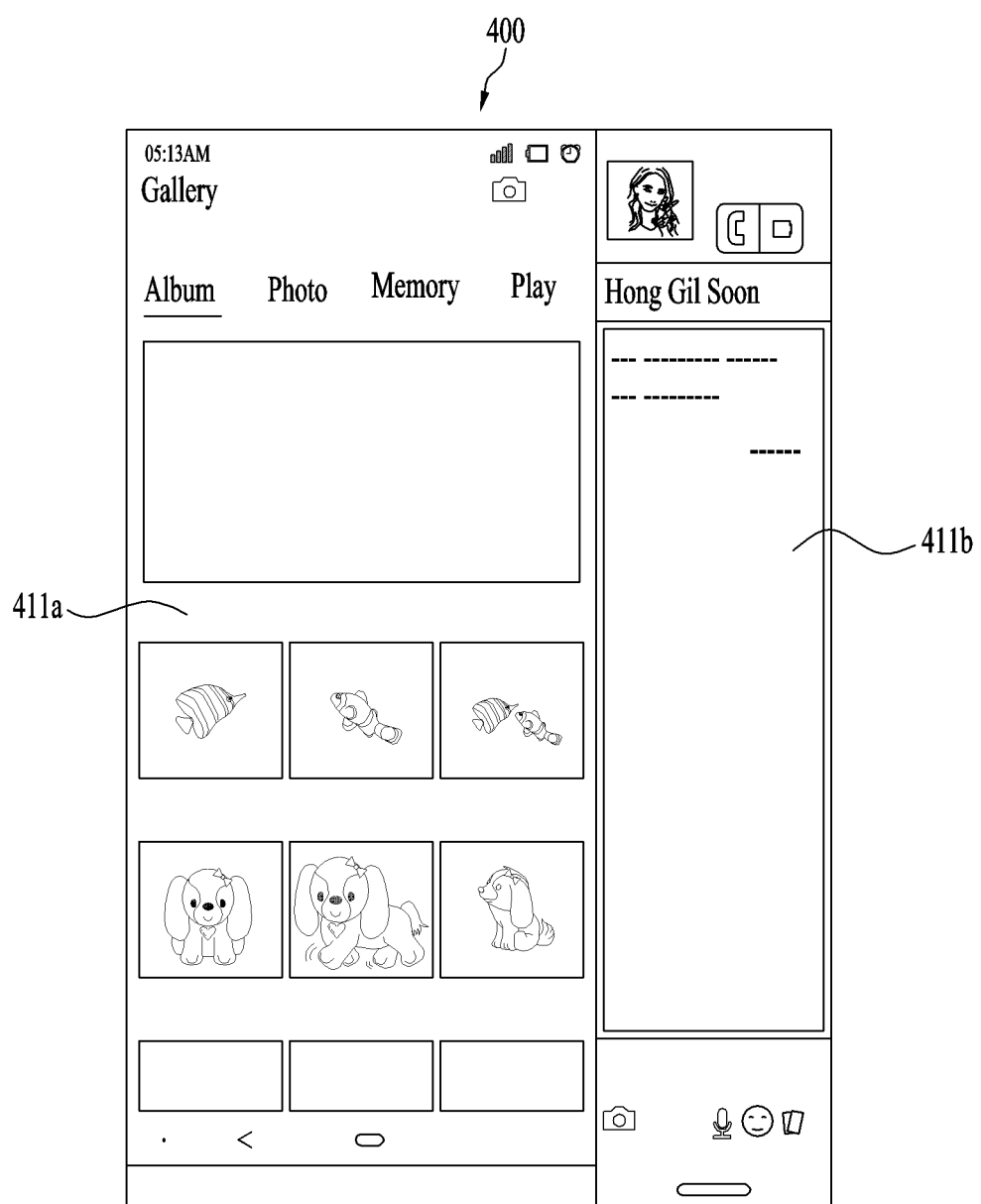
Figure 12C:
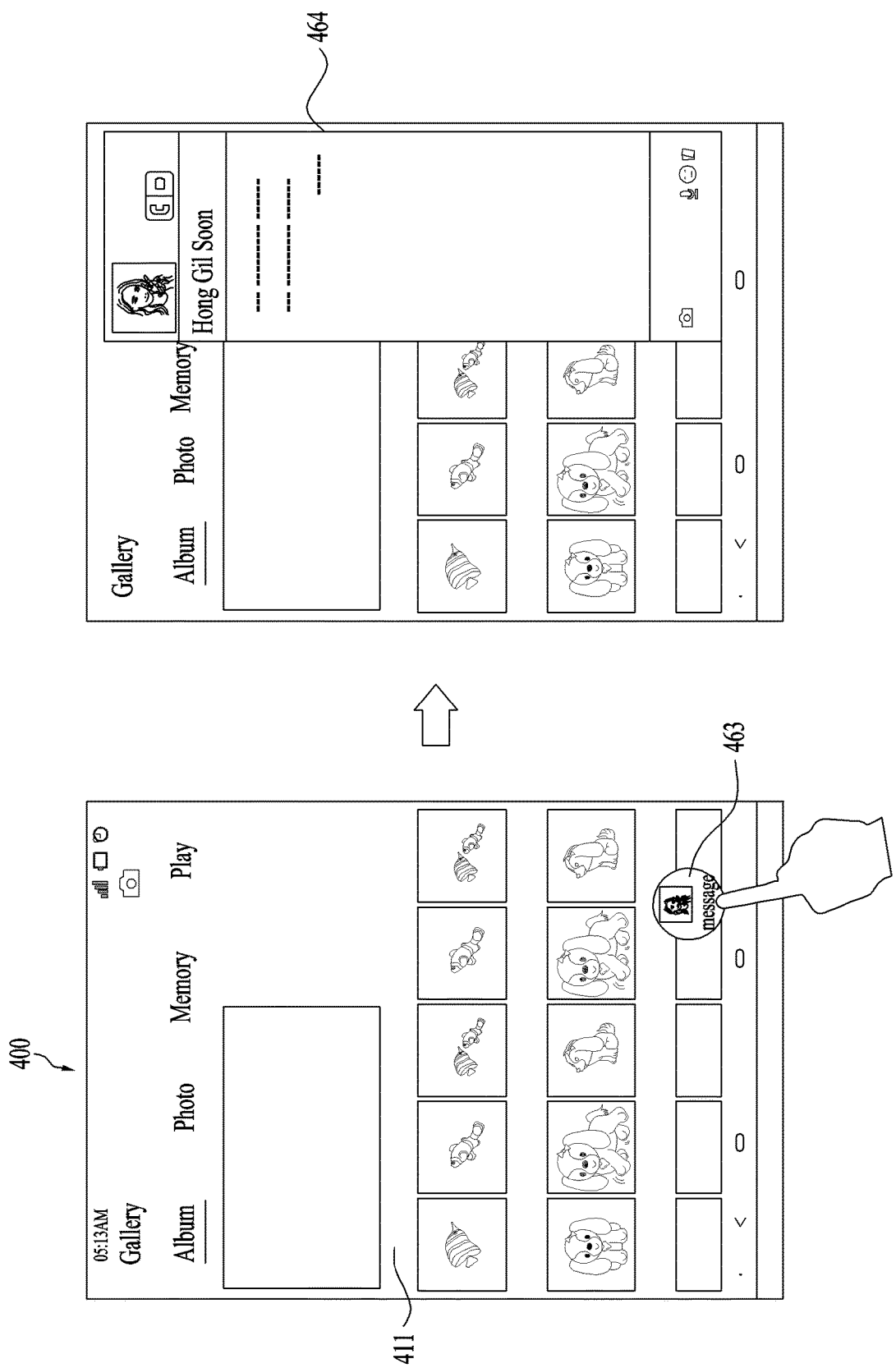

FIGS. 12a to 12c are diagrams for illustrating, when a message is received by a mobile terminal according to the present disclosure, a method for extending a display of the mobile terminal.

FIG. 12a illustrates a case in which, when a message is received by the mobile terminal 400, a notification 462 for the message is displayed on the first display 411, and the user performs the touch drag in the first direction 422a.

The touch drag is caused by the touch signal having the value equal to or greater than the threshold value, so that the first display 411 of the mobile terminal 400 may be extended. However, unlike the extension in (a) in FIG. 11, as the notification 462 for the message is displayed, the first display 411 of the mobile terminal 400 may be extended in various schemes.

First, as shown in FIG. 12b, message information may be provided only on the display 411b that is extended based on the touch drag of the user in the first display of the mobile terminal 400. The extended display 411b refers to the first extended display 411b. In addition, the first fixed display 411a may display an existing task screen except for the notification.

As another scheme for extending the display, as shown in FIG. 12c, the existing task screen except for the notification may be displayed intactly in a great portion of the extended first display 411 including the first extended display of the mobile terminal 400. More specifically, the existing task screen and remaining regions of an existing task screen that does not appear on the first fixed display may be displayed on the extended first display 411. In addition, the notification may be modified and displayed as a separate small notification tab 463. Thereafter, when the user clicks the notification tab 463, message information corresponding to the notification tab may be displayed on a separate screen on the extended first display 411. The separate screen may be changed to a size desired by the user by performing the touch drag at an outer portion of the screen.

FIG. 13 illustrates diagrams associated with, when a video call is received by a mobile terminal according to the present disclosure, extension of a display of the mobile terminal.

Generally, when the video call is received, a touch drag operation may be performed to determine whether to accept the video call. As shown in (a) in FIG. 13, when the touch drag operation is performed with a thin touch region on the first display 411 of the mobile terminal 400 according to the present disclosure, although the touch drag operation is performed in a direction 422c that is the same as the extension direction of the screen, the mobile terminal 400 may display a video call screen on the first fixed display 411a without the separate display extension. On the other hand, as shown in (b) in FIG. 13, when the touch drag operation including a thick touch region is performed in the first direction 422a in which the display is extended, the mobile terminal 400 may display the video call screen on an entire first display including the first fixed display 411a and the first extended display 411b. In addition, the first fixed display 411a and the first extended display 411b may be divided from each other and may respectively display images of the user and a counterpart separately. However, the image of the counterpart may be displayed on the entire first display, and a portion of the image of the counterpart may be overlapped with the image of the user and the image of the user may be displayed.

Figure 14:
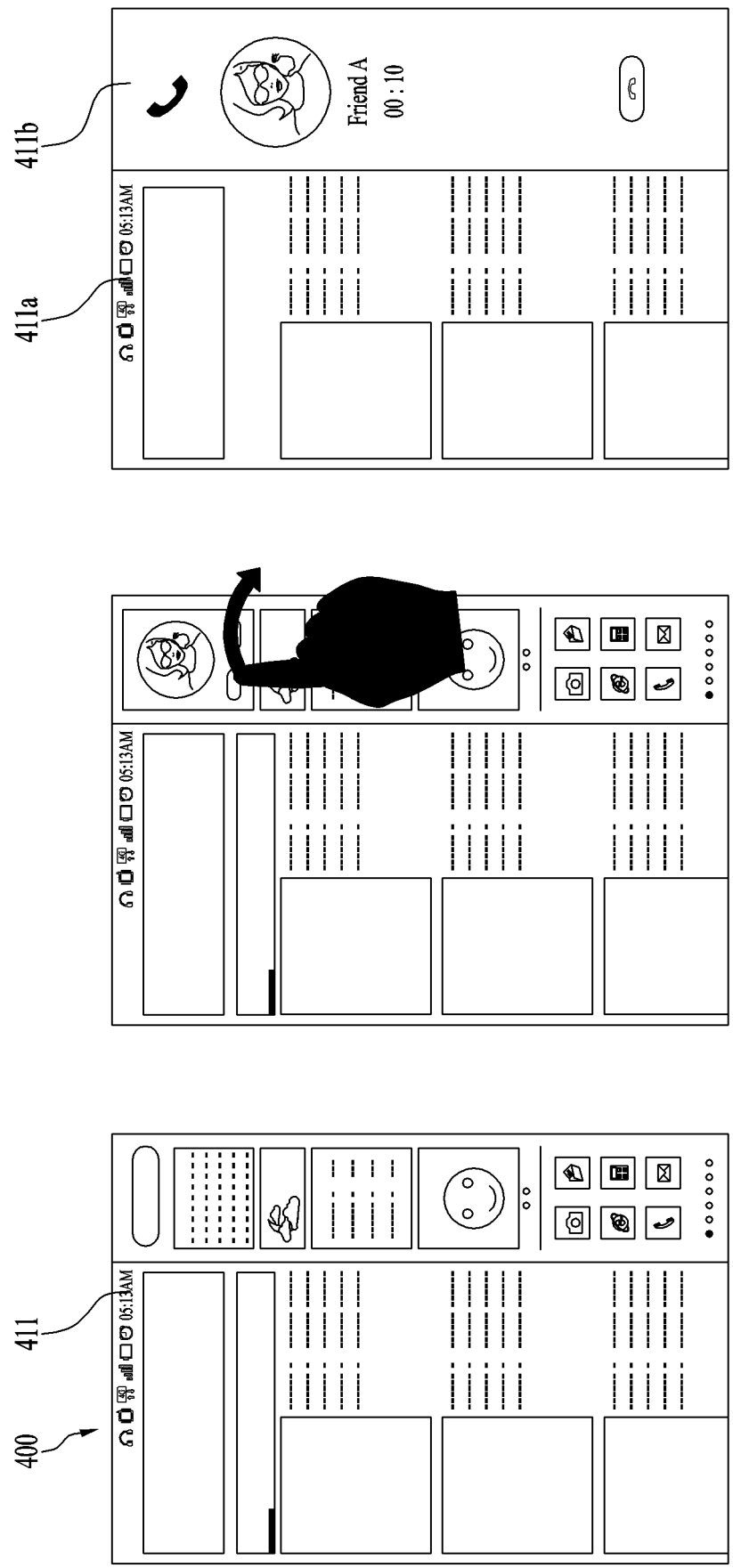
FIG. 14 is a diagram associated with, when a call is received by a mobile terminal according to the present disclosure, extension of a display of the mobile terminal according to an embodiment of the present disclosure.

FIG. 14 is a diagram associated with, when a call is received by a mobile terminal according to the present disclosure, extension of a display of the mobile terminal.

FIG. 13 is an embodiment when the video call is received, and FIG. 14 is an embodiment associated with the extension of the display when the call including a regular call is received. As shown in FIG. 14, a region of the first display 411 located on the front face of the mobile terminal 400 may be divided into two regions, and thus task screens on left and right regions may be different from each other. As will be described later, the first display 411 of the mobile terminal 400 according to the present disclosure may be extended to a plurality of sizes, and the mobile terminal 400 shown at a left side of FIG. 14 may be in a state of being extended to a intermediate size. In this connection, a first task may be performed on the first fixed display, and a second operation may be performed on the first extended display extended to the intermediate size. In this case, when the call is received, the user may extend the first display through the touch drag operation for extending the display. The first display may be further extended, and a call screen may be displayed on the first extended display 411b, which is further extended. On the other hand, the first task which has been performed before the call reception may still be displayed on the first fixed display 411a.

Figure 15:
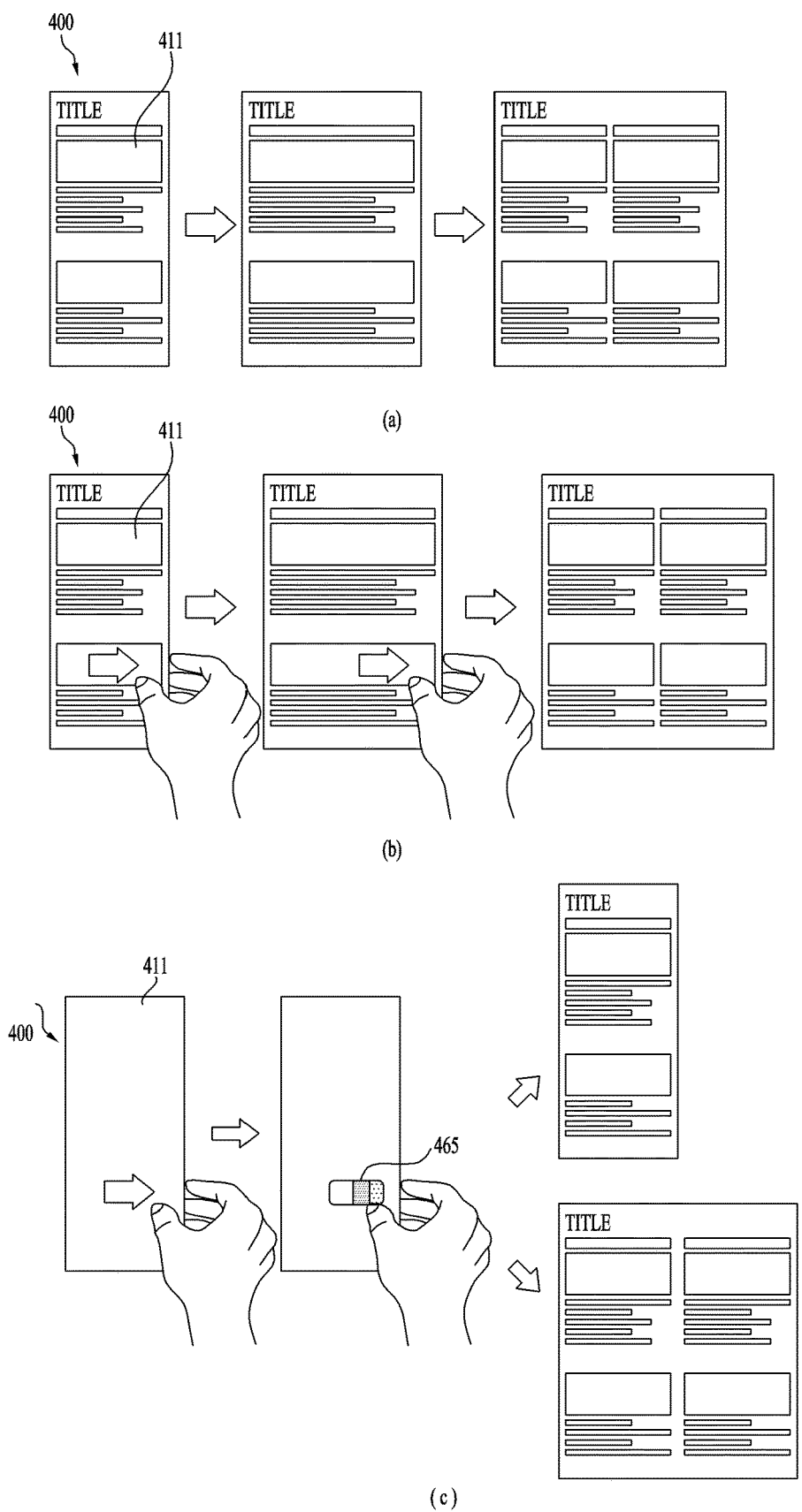
FIG. 15, including parts (a)-(c), illustrates diagrams illustrating, when there are a plurality of extended sizes of a display of a mobile terminal, a method for controlling the plurality of extended sizes of the display of the mobile terminal according to an embodiment of the present disclosure.

FIG. 15 illustrates diagrams illustrating, when there are a plurality of extended sizes of a display of a mobile terminal, a method for controlling the plurality of extended sizes of the display of the mobile terminal.

As described above, the display of the mobile terminal according to the present disclosure may be extended to the plurality of sizes. For example, as shown in (a) in FIG. 15, the first display 411 located on the front face of the mobile terminal 400 according to the present disclosure may be extended in two steps.

In this case, as shown in (b) in FIG. 15, the first display 411 of the mobile terminal 400 may be extended in steps through a plurality of touch drag operations. The touch drag operation refers to a touch drag operation having a touch area equal to or greater than the threshold value for extending the display. Therefore, when the display is extended in step 1 by one touch drag operation and then the touch drag operation is performed again, the display may be extended in the two steps. In one example, when the touch drag operation for reducing the display is performed on the mobile terminal including the display extended in the step 1, the mobile terminal may be transformed into a mobile terminal having only the first fixed display which is a basic size.

In addition, as shown in (c) in FIG. 15, when performing the touch drag operation for extending the display on the first display 411 of the mobile terminal 400, a separate selection menu 465 may be displayed. The selection menu 465 may be displayed overlapping with a touch drag region. In this case, the user may select a size of the extended display desired by the user in the selection menu 465. Accordingly, the size of the first display 411 of the mobile terminal 400 may be changed.

In one example, three sizes of the display of the mobile terminal 400 of FIG. 15 including a basic setting size and two display sizes capable of additional extension are illustrated, but the present disclosure is not limited thereto. For example, the three sizes of the display respectively in aspect ratios of 21:9, 16:9, 4:3 of the mobile terminal are illustrated, but a display size step may be changed or reset based on a quality, a type, and the like of an image or a content displayed on the mobile terminal.

Figure 16:
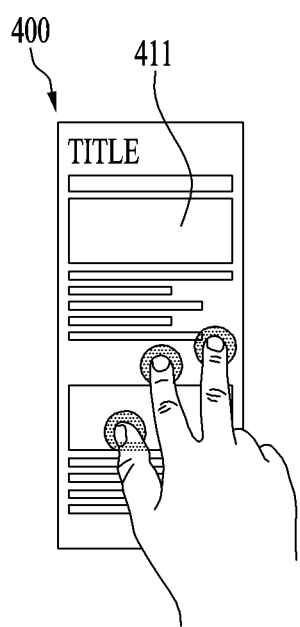
FIG. 16 is a diagram illustrating a touch operation for controlling a size of a display of a mobile terminal according to an embodiment of the present disclosure.

FIG. 16 is a diagram illustrating another embodiment of a touch operation for controlling a size of a display of a mobile terminal according to the present disclosure.

In FIGS. 8 to 15, it was determined that, when one touch signal is input to the display of the mobile terminal, whether the calculated touch area of the touch signal is equal to or greater than the threshold value. FIG. 16 illustrates a case in which a plurality of touch signals are simultaneously input. The case in which the plurality of touch signals are simultaneously input is a case in which the a plurality of fingers of the user touch the first display 411 of the mobile terminal 400 simultaneously, for example as shown in FIG. 16. In this case, the controller of the mobile terminal 400 may sum touch areas of the plurality of fingers and then determine whether a total touch area is equal to or greater than the preset threshold value.

When one touch signal is the input signal, whether to extend the display may be determined by a touch drag direction that is continuously or discontinuously performed with the touch signal. Further, when the plurality of touch signals are the input signals, whether to extend the display may be determined based on movement of the plurality of touch signals. For example, when the plurality of touch signals are input on the first display 411 of the mobile terminal 400 and are equal to or greater than the threshold value, and subsequently, when the plurality of touch signals move in a direction to be farther away from each other, the size of the first display 411 may be extended. In contrast, when the plurality of touch signals move in a direction to be closer to each other, the size of the first display 411 may be reduced. That is, as the plurality of fingers of the user simultaneously touch the first display 411 of the mobile terminal 400 and then the plurality of fingers are spread or pinched on the first display 411, the size of the display of the mobile terminal 400 may be changed.

FIG. 17 illustrates another embodiment of a touch operation for controlling a size of a display of a mobile terminal according to the present disclosure.

In determining the threshold value for extending the display based on the touch area, it may be advantageous for the user to touch the display of the mobile terminal using a thumb of the user. In addition to the thumb, the control of the size of the display 411 is available through various touch operations as shown in FIG. 17. For example, as shown in (a) in FIG. 17, the size of the touch area may be extended using a hand blade. Further, as shown in (b) in FIG. 17, touching the display 411 using a palm is available, which may be differentiated from a general touch by the finger. In this case, when the touch operations (the touch using the hand blade or the palm) have values are equal to or greater than the threshold value, whether to extend or reduce the display 411 may be controlled through the touch drag direction described above.

Figure 18:
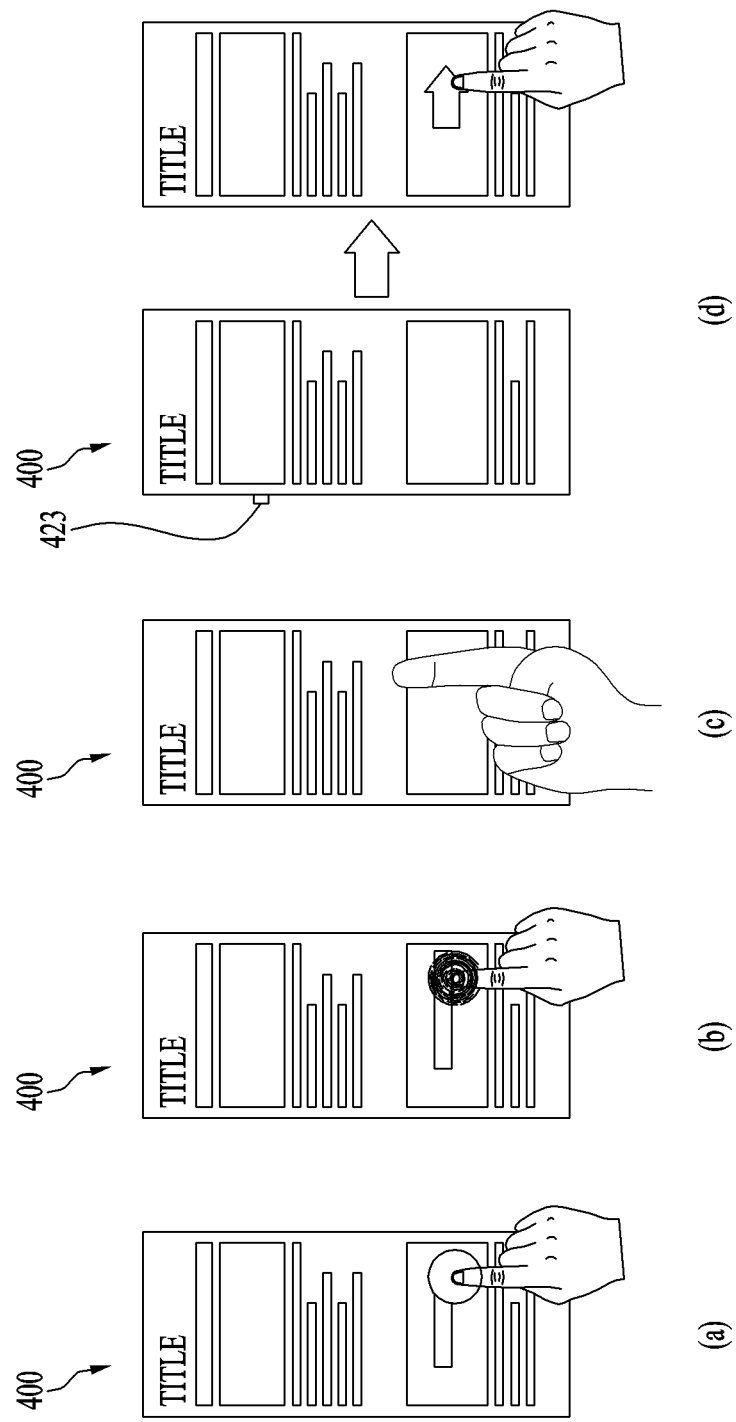
FIG. 18, including parts (a)-(d) illustrates diagrams illustrating various input signals for controlling a size of a display of a mobile terminal according to an embodiment of the present disclosure.

FIG. 18 illustrates diagrams illustrating various input signals for controlling a size of a display of a mobile terminal according to the present disclosure.

FIGS. 8 to 17 illustrate various embodiments in a case in which the touch signal is the input signal. FIG. 18 are examples in which various signals other than the touch signal are used as input signals for changing the display.

In a case of (a) in FIG. 18, the mobile terminal 400 includes a force sensor, and the user applies a pressure to a region where the force sensor of the mobile terminal 400 is located to determine whether a force has a value equal to or greater than a threshold value for changing the screen. When the force equal to or greater than the threshold value is sensed, whether to extend or reduce the display may be controlled through the touch drag direction described above.

In addition, in a case of (b) in FIG. 18, the mobile terminal 400 includes a fingerprint sensor, and the user identifies a fingerprint of the finger in a region where the fingerprint sensor of the mobile terminal 400 is located, so that whether the fingerprint of the finger has a value equal to or greater than the threshold value may be determined. The threshold value may be determined based on a similarity with a fingerprint previously registered by the user. When the fingerprint is identified as the fingerprint preset by the user, whether to extend or reduce the display may be controlled through the touch drag direction described above.

In addition, in a case of (c) in FIG. 18, when the mobile terminal 400 includes a knock sensor, and the user uses a back node and the like of the finger to knock a region where the knock sensor of the mobile terminal 400 is located, whether the knock has a value equal to or greater than a threshold value for changing the display may be determined. The knock sensor may be a sensor in which metal in plastic senses a shock or a vibration and outputs the sensed shock or vibration. Accordingly, the general touch operation and the knock operation may be differentiated from each other. When the knock having the value equal to or greater than the threshold value is sensed, the display of the mobile terminal 400 may be extended. When the knock is performed again in the state in which the display is extended, the display of the mobile terminal 400 may be reduced.

In addition, in a case of (d) in FIG. 18, the mobile terminal 400 may include a physical key 423. In this connection, the physical key 423 is different from the physical key shown in FIG. 6. The display is automatically extended by pressing the physical key in FIG. 6. However, in (d) in FIG. 18, when the physical key 423 is pressed, the mobile terminal 400 may activate a display extendable mode. In the display extendable mode, the display may be extended by the general touch drag operation without requiring the touch area equal to or greater than the threshold value. In this case, a separate indicator indicating the display extendable mode may be displayed on the screen located on the front face of the mobile terminal.

Figure 19:
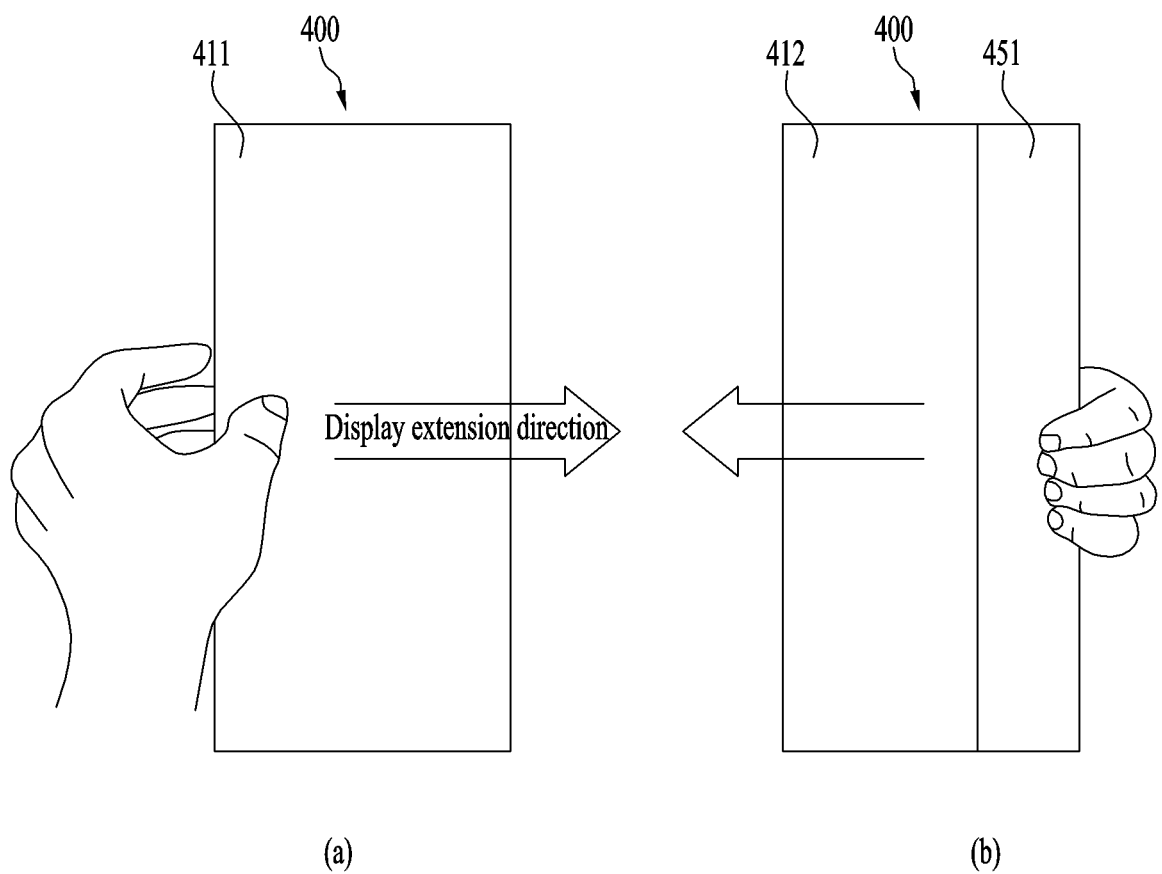
FIG. 19, including parts (a) and (b), illustrates a sensing unit for sensing an input signal of FIG. 18 is disposed in a mobile terminal according to an embodiment of the present disclosure.

FIG. 19 illustrates an embodiment in which a sensing unit for sensing an input signal of FIG. 18 is disposed in a mobile terminal according to the present disclosure.

In FIG. 18, the sensors for sensing the various input signals are arranged are illustrated to be arranged in the display of the mobile terminal, but the present disclosure is not limited thereto.

For example, as shown in (a) and (b) in FIG. 19, the mobile terminal 400 according to the present disclosure includes a display including the first display 411 located on the front face of the mobile terminal 400 and a second display 412 located on a rear face of the mobile terminal 400. In addition, the first display 411 is continuously connected to the second display, so that the display may have a structure of surrounding one side face of the mobile terminal. In one example, the front face of the mobile terminal 400 is almost covered with the first display 411. However, the rear face of the mobile terminal 400 may be divided into a first rear face on which the second display 412 is located and a second rear face 451 excluding the first rear face. Therefore, the sensing unit including the sensors for sensing the various input signals of FIG. 18 may be arranged on the second rear face 451.

The sensing unit may include the force sensor, the fingerprint sensor, and the like, and may be located in an entire region or a specific region of the second rear face 451. Advantages of a case in which the sensing unit is disposed in the second rear face 451 are as follows. For example, when the user grips the mobile terminal 400 according to the present disclosure for extending the display, as shown in (a) in FIG. 19, some regions of the front and rear faces of the mobile terminal 400 adjacent to one side face that is not extended may be supported. When the thumb of the user who touches the front face determines a change direction of the display by the touch drag, as shown in (b) in FIG. 19, the sensing unit located on the second rear face 451 may naturally be in contact with remaining fingers except for the thumb of the user. Therefore, whether the threshold value is satisfied may be determined based on a force, a fingerprint, or the like by the remaining fingers.

For example, the fingerprint sensor may be included in the second rear face 451, and the threshold value of the fingerprint sensor may be determined based on fingerprint recognition of the remaining fingers. When the user uses the mobile terminal for a general task other than for extending the display, it may be rare to grip the mobile terminal 400 as shown in (a) in FIG. 19. That is, in most cases, the user may naturally take the grip form as shown in (a) in FIG. 19 for extending the display. In this case, when whether the threshold value is satisfied is determined at the grip position, the user may more precisely and safely control the display extension function.

Further, in addition to disposing the sensing unit in the second rear face 451, the fingerprint sensor or the force sensor may be disposed in a specific region of the first display 411 where the thumb is located in the grip form. The specific region may be formed on one side face of the first fixed display of the mobile terminal 400 that is not extended.

The description above is merely illustrative of the technical idea of the present disclosure, and various modifications and changes may be made by those skilled in the art without departing from the main characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments.

The scope of the present disclosure should be construed as being covered by the scope of the appended claims, and all technical ideas falling within the scope of the claims should be construed as being included in the scope of the present disclosure.

What is claimed is:

1. A mobile terminal comprising:
a body having a variable size;
a flexible display including a first display located on a front face of the body and a second display located on a rear face of the body;
a driving unit configured to change both the variable size of the body and a size of the first display;
a sensing unit configured to sense an input signal; and
a controller configured to:
in response to the input signal having a value equal to or greater than a threshold value, control the driving unit to change both the variable size of the body and the size of the first display,
wherein a total area of the first display and the second display remains constant, and
wherein a size of the second display exposed to an outside of the mobile terminal is correspondingly reduced as the size of the first display exposed to an outside of the mobile terminal increases.

2. The mobile terminal of claim 1, wherein the sensing unit includes a touch sensor embedded in the flexible display, and
wherein the threshold value is based on a touch area on the first display touched by a user.

3. The mobile terminal of claim 2, wherein the controller is further configured to:
in response to the touch area of the user being equal to or greater than the threshold value, change the size of the first display based on a touch drag direction of a touch drag of the user.

4. The mobile terminal of claim 3, wherein the controller is further configured to:
extend the size of the first display when the touch drag direction corresponds to a first direction, and
reduce the size of the first display when the touch drag direction corresponds to a second direction.

5. The mobile terminal of claim 4, wherein the controller is further configured to:
when a message is received by the mobile terminal, provide information about the message on an extended portion of the first display based on the touch drag of the user.

6. The mobile terminal of claim 4, wherein the controller is further configured to:
when a video call is received by the mobile terminal, provide a video call screen on an entirety of the first display after the first display is extended based on the touch drag of the user.

7. The mobile terminal of claim 2, wherein the controller is further configured to:
   in response to sensing, via the sensing unit, a plurality of touch signals simultaneously on the first display, add areas based on the plurality of touch signals to generate a sum and compare the sum with the threshold value.

8. The mobile terminal of claim 7, wherein the controller is further configured to:
   change the size of the first display when the sum of the areas is equal to or greater than the threshold value.

9. The mobile terminal of claim 8, wherein the controller is further configured to:
   extend the size of the first display when the plurality of touch signals correspond to touches that move farther away from each other; and
   reduce the size of the first display when the plurality of touch signals corresponding to touches that move closer together.

10. The mobile terminal of claim 2, wherein the controller is further configured to:
   display, on the first display, a selection menu for changing the size of the first display when the value of the input signal is equal to or greater than the threshold value.

11. The mobile terminal of claim 2, wherein the first display of the flexible display is configured to be changed to one of a plurality of sizes, and
   wherein the controller is further configured to:
   display, on the first display, a selection menu for selecting one of the plurality of sizes when the value of the input signal is equal to or greater than the threshold value.

12. The mobile terminal of claim 11, wherein the controller is further configured to:
   display the selection menu on the first display in a location overlapping with a region of the first display touched by the user.

13. The mobile terminal of claim 1, wherein the sensing unit includes a force sensor, and
   wherein the threshold value is based on a pressure applied by a user to the sensing unit.

14. The mobile terminal of claim 1, wherein the sensing unit includes a fingerprint sensor, and
   wherein the threshold value is based on a fingerprint previously registered by a user.

15. The mobile terminal of claim 13, wherein the rear face of the body includes a first rear face including the second display of the flexible display and a second rear face excluding the second display, and
   wherein the second rear face includes a part of the sensing unit.

16. The mobile terminal of claim 14, wherein the rear face of the body includes a first rear face including the second display of the flexible display and a second rear face excluding the second display, and
   wherein the second rear face includes a part of the sensing unit.

17. The mobile terminal of claim 1, wherein the sensing unit includes a touch sensor embedded in the flexible display, and
   wherein the threshold value is based on a total contact area of a user with the touch sensor when the user inputs a touch drag on the first display.

18. A method of controlling a size of a mobile terminal, the method comprising:
   in response to sensing, via a sensing unit of the mobile terminal, a touch input on a first display having a value equal to or greater than a threshold value, increasing both a variable size of a body of the mobile terminal and a size of the first display located on a front face of the body and exposed to an outside of the mobile terminal while corresponding decreasing a size of a second display located on a rear face of the body and exposed to the outside of the mobile terminal,
   wherein a total area of the first display and the second display remains constant.

19. The method of claim 18, further comprising:
   in response to a touch area of the touch input being equal to or greater than the threshold value, changing the size of the first display based on a touch drag direction of the touch input.

20. The method of claim 18, further comprising:
   displaying, on the first display, a selection menu for selecting one of a plurality of sizes when the value of the touch input is equal to or greater than the threshold value,
   wherein the first display of the flexible display is configured to be changed to one of the plurality of sizes.

* * * * *